United States Patent [19]

Ishizuka et al.

[11] Patent Number: 5,036,192
[45] Date of Patent: Jul. 30, 1991

[54] ROTARY ENCODER USING REFLECTED LIGHT

[75] Inventors: Koh Ishizuka; Tetsuharu Nishimura, both of Kawasaki; Osamu Kasahara, Yokohama, all of Japan

[73] Assignee: Canon Kabushiki Kaisha, Tokyo, Japan

[21] Appl. No.: 608,629

[22] Filed: Nov. 6, 1990

Related U.S. Application Data

[63] Continuation of Ser. No. 356,596, May 23, 1989, abandoned, which is a continuation of Ser. No. 2,229, Jan. 12, 1987, abandoned.

[30] Foreign Application Priority Data

| Jan. 14, 1986 | [JP] | Japan | 61-5733 |
| Jan. 14, 1986 | [JP] | Japan | 61-5734 |
| Jan. 14, 1986 | [JP] | Japan | 61-5736 |
| Jan. 14, 1986 | [JP] | Japan | 61-5740 |
| Jan. 14, 1986 | [JP] | Japan | 61-5741 |
| Feb. 27, 1986 | [JP] | Japan | 61-42673 |

[51] Int. Cl.⁵ ............................................. G01D 5/34
[52] U.S. Cl. ............................. 250/231.16; 250/237 G
[58] Field of Search ........ 250/231 SE, 237 G, 231.13, 250/231.04, 231.16; 341/13; 356/373–375, 395, 351, 354, 356, 358; 33/125 A, 125 C, 707

[56] References Cited

U.S. PATENT DOCUMENTS

| 3,726,595 | 4/1973 | Matsumoto | 356/111 |
| 3,738,753 | 6/1973 | Huntley, Jr. | 356/111 |
| 3,756,723 | 9/1973 | Hock | 356/110 |
| 3,842,261 | 10/1974 | MacGovern et al. | 250/237 G |
| 3,891,321 | 6/1975 | Hock | 356/111 |
| 3,983,391 | 9/1976 | Clemons | 250/237 G |
| 4,629,886 | 12/1986 | Akiyama et al. | 250/237 |
| 4,676,645 | 6/1987 | Taniguchi et al. | 356/356 |
| 4,677,301 | 6/1987 | Tanimoto et al. | 250/548 |

FOREIGN PATENT DOCUMENTS

| 1169150 | 4/1964 | Fed. Rep. of Germany . |
| 3316144 | 11/1983 | Fed. Rep. of Germany . |
| 58-191906 | 9/1983 | Japan . |
| 58-191907 | 9/1983 | Japan . |
| 906101 | 9/1962 | United Kingdom . |
| 997405 | 7/1965 | United Kingdom . |
| 1282048 | 7/1972 | United Kingdom . |

*Primary Examiner*—David C. Nelms
*Attorney, Agent, or Firm*—Fitzpatrick, Cella, Harper & Scinto

[57] ABSTRACT

This invention discloses a linear/rotary encoder for detecting the state of movement of a grating. The encoder of this invention comprises a system for directing a coherent beam of light onto a predetermined position or positions of a diffraction grating formed on an object to be measured, a converging optical system having a reflection plane at a position on which light is converged, for again making incident on the respective different positions diffracted lights which exit from the position, an interference optical system for forming interference fringes by superposing beam diffracted from the diffraction grating at the predetermined position or positions, and light receiving elements for photoelectrically converting the interference fringes obtained through the interference optical system.

24 Claims, 8 Drawing Sheets

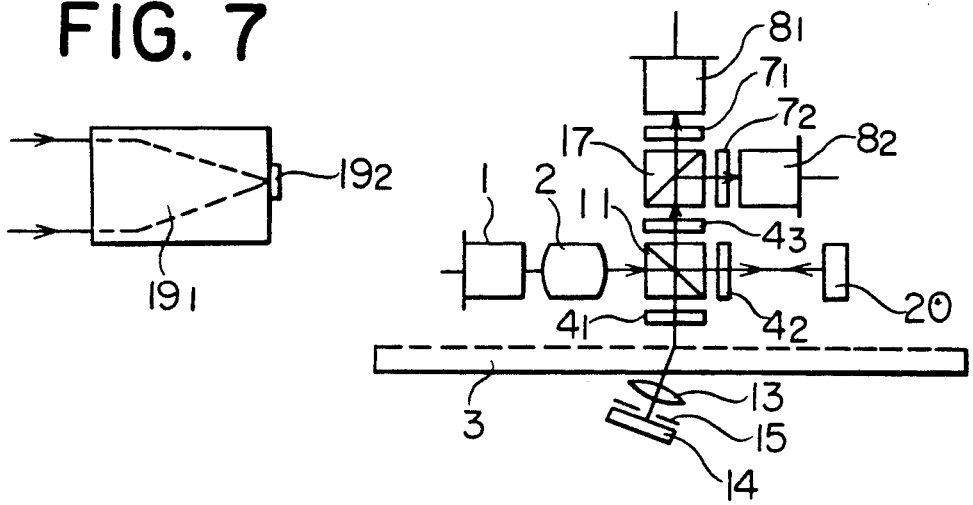
FIG. 7
FIG. 8
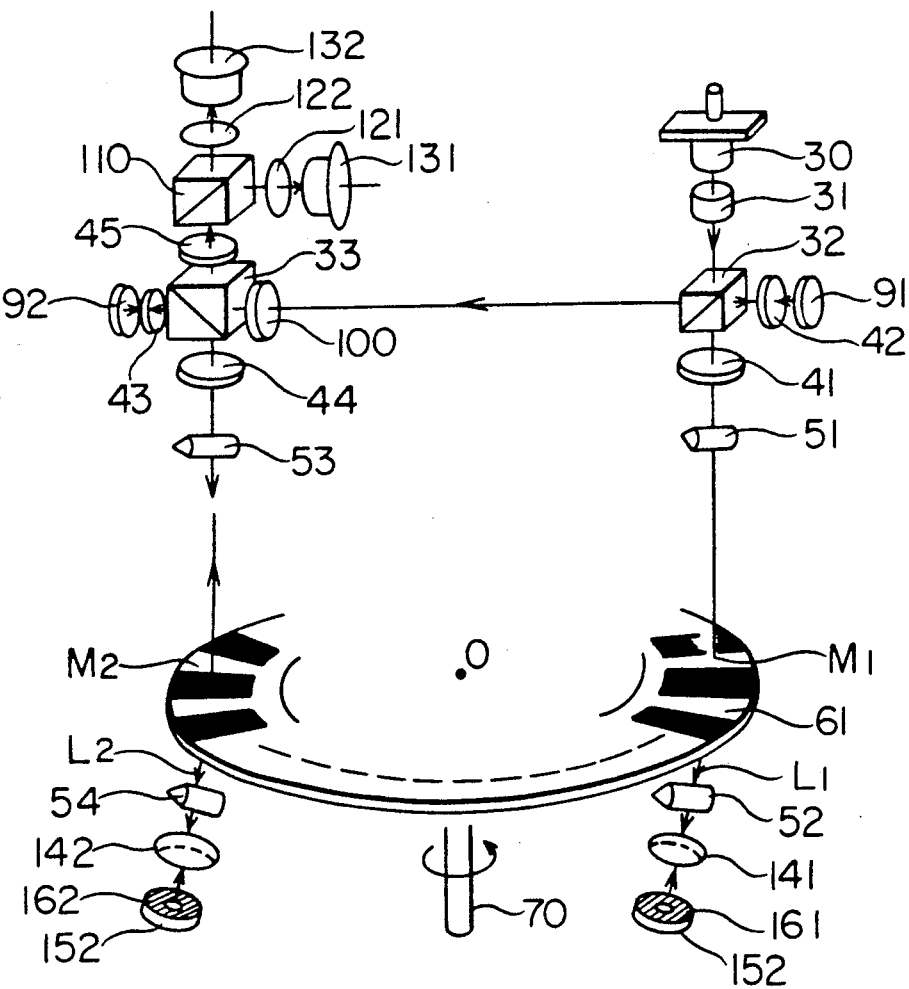
FIG. 9

ROTARY ENCODER USING REFLECTED LIGHT

This application is a continuation of application Ser. No. 356,596 filed May 23, 1989, which is a continuation of application Ser. No. 002,229 filed Jan. 12, 1987, both now abandoned.

BACKGROUND OF THE INVENTION

1. Field of the Invention

The present invention relates generally to an encoder, and more particularly to an encoder in which a coherent beam of light is made incident on a diffraction grating mounted on a movable or rotatable object, a beam diffracted from the diffraction grating being made to interfere with itself to form interference fringes, and the number of light and dark bands included in the interference fringes being counted, thereby measuring the magnitude of travel of the diffraction grating, that is, the magnitude of travel or rotation of the object.

2. Related Background Art

In the fields relating to precision machines such as NC machine tools and semiconductor printing apparatus, a demand has recently arisen with respect to precision measuring instruments capable of making measurements in a unit of 1 $\mu$m or less (submicron).

As a typical measuring instrument capable of making measurement in a unit of submicron, a linear encoder employing interference fringes has heretofore been known in which a coherent beam of light such as a laser beam is used to obtain a beam diffracted from a moving object, thereby forming the interference fringes.

The aforementioned type of linear encoder is disclosed, for example, in U.S. Pat. Nos. 3,738,753, 3,726,595 and 4,676,645; Japanese Utility Model Laid-open No. 81510/1982; and Japanese Patent Laid-open Nos. 207805/1982 and 19202/1982.

FIG. 1 is a schematic illustration of the construction of one example of a prior-art linear encoder. As shown in FIG. 1, the linear encoder includes a laser 1, a collimator lens 2 and a diffraction grating 3 of a grating pitch d mounted on a movable object (not shown), the diffraction grating 3 being moved, for example, at a velocity v in the directions indicated by a doubleheaded arrow shown.

The linear encoder also includes quarter-wave plates $4_1$, $4_2$, roof prisms or corner cube reflection mirrors $5_1$, $5_2$ for preventing the optical axis of a re-diffracted beam from being shifted by the inclination of the diffraction grating 3, a beam splitter 6, polarizing plate $7_1$, $7_2$ in which their axes of polarization are cross perpendicular to each other and are arranged to form an angle of 45° with respect to the respective polarization axes of the quarter-wave plates $4_1$, $4_2$, and light receiving element $8_1$, $8_2$.

Referring to FIG. 1, the laser beam emitted from the laser 1 is collimated into a substantially parallel beam by the collimator lens 2, then being made incident on the diffraction grating 3. Positive and negative lights diffracted into "positive and negative m" orders by the diffraction grating 3 are respectively passed through the quarter-wave plates $4_1$, $4_2$, then reflected by the corner cube reflection mirrors $5_1$, $5_2$. The respective reflected beams are again made incident on the diffraction grating 3, then re-diffracted into "positive and negative m" orders, and superposed on each other. The beam superposed is split into two beams of light by the beam splitter 6, and the beams are respectively made incident on the light receiving elements $8_1$, $8_2$ through the polarizing plates $7_1$, $7_2$.

The beams incident on the light receiving elements $8_1$, $8_2$ are 90° out of phase with respect to each other through a combination of the quarter-wave plates $4_1$, $4_2$ and the polarizing plates $7_1$, $7_2$, such incident beams being used for discrimination of the direction of travel of the diffraction grating 3. Thus, the magnitude of travel of the diffraction grating 3 is calculated by counting the number of light and dark bands of the interference fringes received by the light receiving elements $8_1$, $8_2$.

FIG. 2 is a schematic illustration of another example of a prior-art linear encoder employing a diffracted beam which is transmitted. As shown in FIG. 2, in order to reduce the overall width of the system, a reflection prism 9 is used to bend the beam emitted from the laser 1 and the beam diffracted from the diffraction grating 3, a transmitted diffracted beam being utilized as a diffracted beam. The other arrangement is the same as that of the linear encoder shown in FIG. 1.

In the respective linear encoders shown in FIGS. 1 and 2, the light beam is again made incident on the diffraction grating 3 by means of reflection means such as roof prisms and corner cube reflection mirrors.

With this arrangement, even if the wavelength of the laser 1 is varied, for example, by factors such as ambient temperature and the angle of diffraction of the diffraction grating 3 is changed, the diffraction grating 3 is again illuminated by the respective beams consistently at the same angle, and thus the two rediffracted beams are necessarily superposed on each other, thereby properly maintaining the S/N ratios of the signals output from the light receiving elements $8_1$, $8_2$.

However, when the roof prisms and the corner cube reflection mirrors are to be disposed, they need to be placed at locations at which they do not intercept a zero diffracted order beam. For example, where the grating pitch of the diffraction grating 3 is 3.2 $\mu$m and the wavelength of the beam used by the laser 1 is 0.83 $\mu$m, if a first diffracted order beam is employed, the angle of diffraction is $\sin^{-1}(0.83/32)=15$ degrees. In order to separate the zero diffracted order beam and the reflection means, if the reflection means is disposed at a position, for example, 15 mm away from the normal to the diffraction grating 31 (the direction of the optical axis of the zero diffracted order beam) at a location where the beam is incident on the diffraction grating 3, the reflection means must be disposed at a location which is remote from the diffraction grating 3 by $15/\tan 15°=56$ (mm). Therefore, the use of the roof prisms and the corner cube reflection mirrors cannot avoid an increase in the overall size of the system.

Rotary encoders of interference fringe detection types have previously been disclosed in U.S. Ser. No. 07/393,104 and U.S. Pat. Nos. 4,829,342 and 4,868,385 which are assigned to the same assignee as in the case of the present application. In these types of rotary encoders, if roof prisms and corner cubes are employed in order to again make diffracted a beam incident on a diffraction grating, this is a large obstacle to a reduction in the overall size of the system.

In general, roof prisms and corner cubes involve disadvantages in that highly accurate working is necessary, production thus being difficult, and a high cost thus results.

SUMMARY OF THE INVENTION

It is therefore an object of the present invention to provide an encoder in which its overall size is reduced by the use of a particular type of reflection means in order to solve the above-described problems.

It is another object of the present invention to provide a rotary encoder which is of a small size and yet has a high resolution.

Accordingly, the encoder in accordance with the present invention comprises: light source means for directing a coherent beam of light onto a diffraction grating formed on a movable or rotary object; reflection means for again making incident on the diffraction grating a diffracted beam which exits from the aforementioned diffraction grating; optical means for forming interference fringes by the use of the beam which is re-diffracted by the diffraction grating; and light receiving means for converting the interference fringes in a photoelectric manner; the aforementioned reflection means being provided with a reflection plane in the vicinity of a position on which the diffracted beam is converged.

To these ends, the rotary encoder in accordance with the present invention also comprises: means for directing a coherent beam of light onto different positions of the diffraction grating which is formed in the direction of rotation of the rotating object; a converging optical system including a reflection plane in the vicinity of a position on which the diffracted beam is converged, such system again making incident on the different positions the diffracted beam which exits therefrom; interference means for mutually superposing the beams re-diffracted by the aforementioned different positions, so that they interfere with each other; and light receiving means for converting the interference fringes obtained by the interference means in a photoelectric manner.

BRIEF DESCRIPTION OF THE DRAWINGS

FIGS. 5, 6 and 7 respectively diagrammatically show examples of the construction of reflection means in accordance with the present invention;

FIG. 8 is a view diagrammatically showing the optical system of another embodiment of the encoder in accordance with the present invention;

FIG. 9 is a view diagrammatically showing the optical system of a first preferred embodiment of the encoder in accordance with the present invention;

DETAILED DESCRIPTION OF THE PREFERRED EMBODIMENTS

Figure 1:
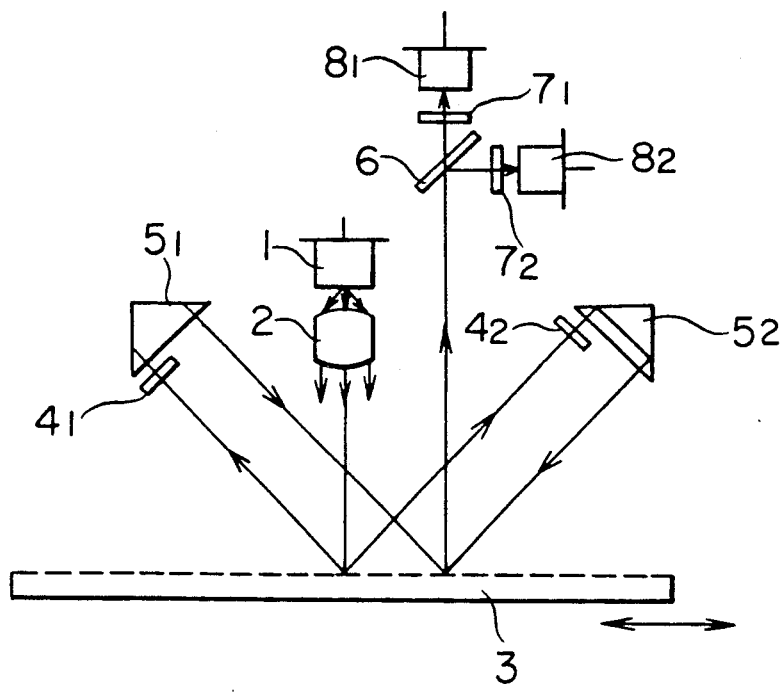
FIG. 1 is a view diagrammatically showing one example of a linear encoder of the prior art.
Figure 2:
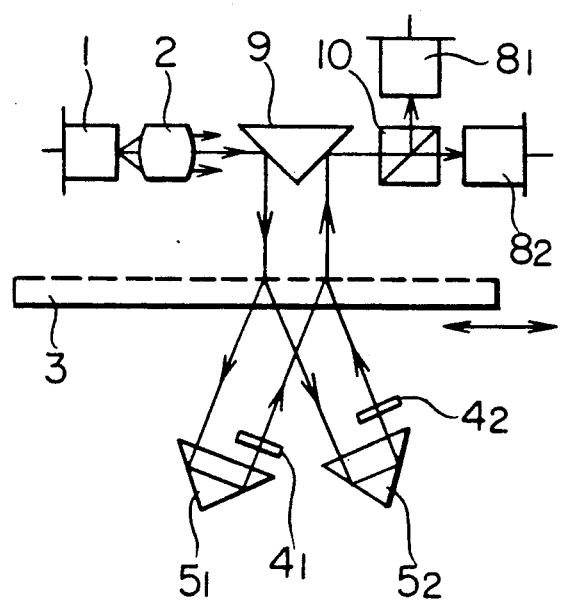
FIG. 2 is a view diagrammatically showing another example of a linear encoder of the prior art.
Figure 3:
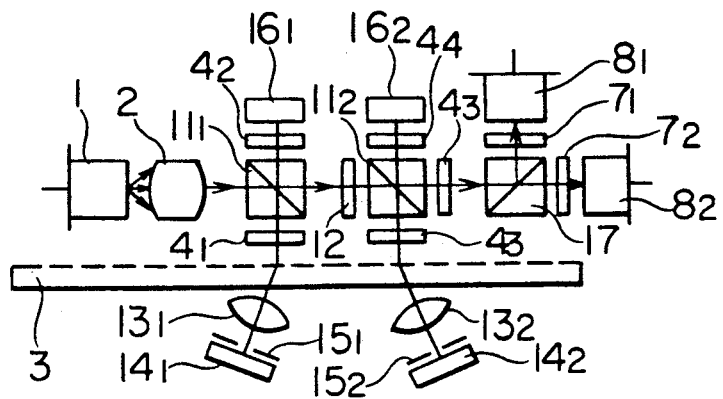
FIG. 3 is a view diagrammatically showing one embodiment of an encoder in accordance with the present invention.

FIG. 3 is a diagrammatic illustration of a preferred embodiment of an encoder in accordance with the present invention, in which like reference numerals are used to denote the like or corresponding elements which constitute each of the components shown in FIG. 1.

In this embodiment, a coherent beam of light emitted from the laser 1 is collimated into a substantially parallel beam by the collimator lens 2, and this beam is made incident on a polarizing beam splitter $11_1$, by which the incident beam is split into two beams: a transmitted beam and a reflected beam which are respectively linearly polarized. The latter reflected beam is circularly polarized by the quarter-wave plate $4_1$, then made incident on the diffraction grating 3. A particular diffracted order beam which is transmitted through the diffraction grating 3 is converged by a first beam-converging system including a converging lens $13_1$, a beam limiting mask $15_1$ and a reflection mirror $14_1$. After the beam has been returned along substantially the same optical path, it is again made incident on the diffraction grating 3.

Figure 5:
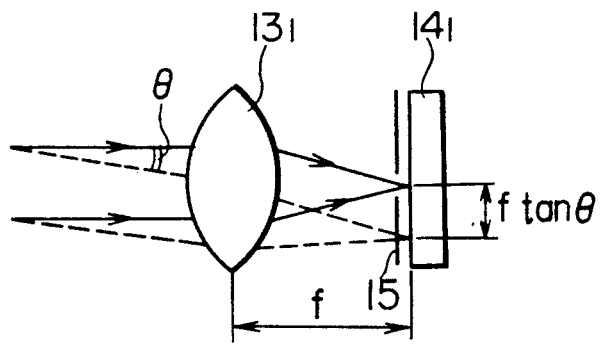

FIG. 5 is an illustration of the first beam converging system incorporated in this embodiment. As shown in FIG. 5, since the reflection mirror $14_1$ is substantially disposed in the focal plane of the converging lens $13_1$, the parallel component of the particular diffracted order beam entering the converging lens $13_1$ is allowed to pass through an aperture of the mask $15_1$, and then reflected by the reflection mirror $14_1$ and returned along the same optical path. In this case, the other diffracted order beams are cut off by the mask $15_1$ so that they may not be returned to the diffraction grating 3.

Referring back to FIG. 3, the diffracted beam which is re-diffracted by the diffraction grating 3 is linearly polarized by the quarter-wave plate $4_1$ with the axis of polarization being shifted through 90° relative to that at the time of the preceding incidence. The linearly-polarized beam is transmitted through the polarizing beam splitter $11_1$, then circularly polarized by the quarter-wave plate $4_2$ and reflected by a reflection mirror $16_1$. Subsequently, the beam is linearly polarized by the quarter-wave plate $4_2$ with the axis of polarization being shifted through 90° relative to that at the time of the preceding incidence, then reflected by the polarizing beam splitter $11_1$ toward a quarter-wave plate 12. The axis of polarization of the reflected beam is rotated through 90° by the half-wave plate 12, and is transmitted through a polarizing beam splitter $11_2$. After the beam has been circularly polarized through a quarter-wave plate $4_5$, it is split into two beams of light by a beam splitter 17. The respective beams are linearly polarized by the polarizing plates $7_1$, $7_2$, and are made incident on the light receiving elements $8_1$, $8_2$.

On the other hand, the linearly polarized beam, transmitted through the polarizing beam splitter $11_1$, is axially rotated through 90° by the half-wave plate 12, then reflected by the polarizing beam splitter $11_2$. The reflected beam is circularly polarized by a quarter-wave plate $4_3$ and is made incident on the diffraction grating 3. Subsequently, a particular diffracted order light is transmitted through the diffraction grating 3, and, after it has been reflected by a second beam converging system similar to that shown in FIG. 5 so as to return along the same optical path, the returned beam is again made incident on the diffraction grating 3 for re-diffraction purposes. The re-diffracted beam is linearly polarized by the quarter-wave plate $4_3$, then transmitted through the polarizing beam splitter $11_2$. The transmitted beam is circularly polarized by a quarter-wave plate $4_4$ and is reflected by a reflection mirror $16_2$. Subsequently, the reflected beam is linearly polarized by the quarter-wave plate $4_4$ with the axis of polarization being shifted through 90° relative to that at the time of the preceding incidence, and the thus obtained beam is reflected toward the quarter-wave plate $4_5$ by the polarizing beam splitter $11_2$. The beam is circularly polarized by the quarter-wave plate $4_5$, then reflected by the polarization beam splitter $11_2$. The reflected beam is split into two beams by the beam splitter 17. After the respective beams have been passed through the polarizing plates $7_1$, $7_2$, they are respectively made incident on the corresponding beam receiving elements $8_1$, $8_2$, and the incident beams are superposed on the diffracted beam which is introduced by the aforementioned first beam converging system, thereby forming interference fringes. For reference, FIG. 4 shows solely the optical paths of beams diffracted into positive and negative orders which are incorporated in the arrangement shown in FIG. 3.

Figure 4:
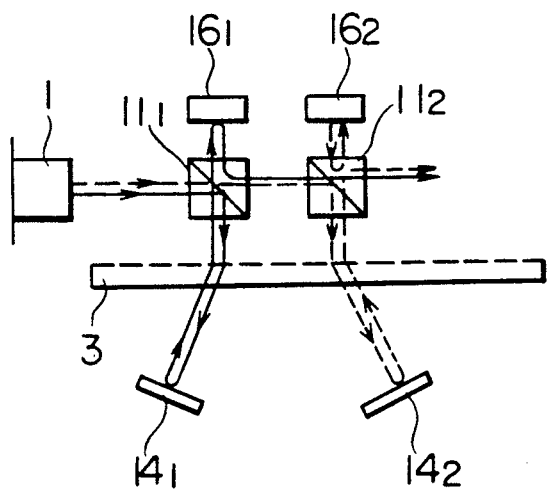
FIG. 4 is an illustration used to explain the optical path of a diffracted beam in the encoder shown in FIG. 3.

Referring to FIG. 4, the beam (shown by a solid line) which is diffracted by the diffraction grating 3 after reflection from the reflection mirror $14_1$ has the same optical path length as the beam (shown by a broken line) which is diffracted by the diffraction grating 3 after reflection from the reflection mirror $14_2$. In this manner, the equalization of the optical path lengths of the two beams which should be mutually superposed to form interference fringes enables arrangement of an optical system which is resistant to variations in the optical path lengths which might be caused by disturbance such as temperature change.

In this embodiment, the phase of a beam diffracted into order "m" is shifted by $2m\pi$ with a one-pitch movement of the diffraction grating 3. Accordingly, since the light receiving elements $8_1$, $8_1$ respectively receive the interference of the beams which are two times subjected to positive and negative m-order diffractions, sinusoidal-wave signals of 4 m in number are obtained when the diffraction grating 3 is moved by one pitch.

As an example, if the pitch of the diffraction grating 3 is 3.2 μm and a first diffracted order beam (m=1) is employed as diffracted beam, when the diffraction grating 3 is moved 3.2 μm, the light receiving elements $8_1$, $8_2$ produce four sinusoidal-wave signals in total. In other words, a quarter of the pitch of the diffraction grating 3, that is, 3.2/4=0.8 μm is obtained as a resolution per sinusoidal wave.

A combination of the quarter-wave plates $4_1$ to $4_5$ and the polarizing plates $7_1$, $7_2$ provides a 90° phase difference between the output signals supplied from the light receiving elements $8_1$, $8_2$, thereby enabling discrimination of the direction of travel of the diffraction grating 3. It is to be noted that, if the sole magnitude of travel of the grating 3 is measured, a single light receiving element may be disposed.

In this embodiment utilizing two beam converging systems each having the construction shown in FIG. 5, the sole beam diffracted into a desired order of the beams diffracted by the diffraction grating 3 is reflected through the respective mask $15_1$, and is used for re-diffraction purposes. The other diffracted order beams can be easily eliminated by the mask $15_1$.

More specifically, as shown in FIG. 5, where an angle formed between the desired diffracted order beam and another beam diffracted into an order next thereto is θ and the focal length of the converging lens $13_1$ is f, the positions at which the two beams are converged on the reflection mirror 14 are separated from each other by f tan θ. Therefore, if the diameter of the aperture in the beam limiting mask $15_1$ is f tan θ or less, it is possible to eliminate beams diffracted into unwanted orders. In the aforementioned example in which the grating pitch of the diffraction grating 3 is 3.2 μm and the wavelength of the light source 1 is 0.83 μm, if the sole beams diffracted into the "±1" orders are reflected, the angle between the zero-order and firstorder diffracted beams θ is 15°. If f=6 mm is selected as the focal length of the converging lens 13, f tan θ=1.6 mm is obtained. Specifically, if the aperture in the beam limiting mask $15_1$ is formed in a circular shape having a diameter of 1.6 mm, the zero diffracted order beams can be eliminated. Since this effected is not concerned with the distance between the diffraction grating 3 and the converging lens 13, the lens 13 may be disposed just behind the diffraction grating 3. Therefore, in the aforementioned case where a convergent lens having a 6 mm focal length is used, a distance of approximately 10 mm between the diffraction grating 3 and the reflection mirror 14 is sufficient, thereby enabling a remarkably slim encoder.

In this embodiment, each of the beam converging system has a reflection plane disposed in the vicinity of its focal plane. Accordingly, even if the angle of diffraction is slightly varied, for example, by changes in the oscillation wavelength of the laser beam and thus the incident angle to the converging lens is changed to some extent, the beam can be reversed along substantially the same optical path. In consequence, the positive and negative diffracted beams are properly superposed on each other, thereby preventing a decrease in the S/N ratios of the output signals from the light receiving elements $8_1$, $8_2$.

Figure 6:
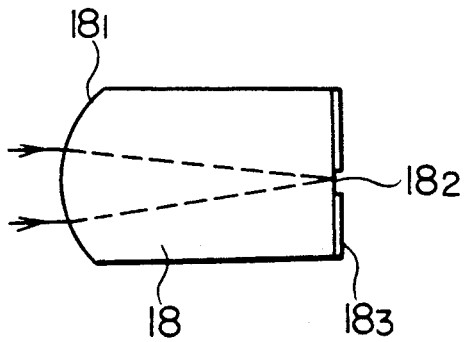

It is to be noted that the beam converging systems incorporated in the above-described embodiment may be constructed, for example, as shown in FIG. 6 by an integral combination of the converging lens, the mask and the reflection mirror.

In FIG. 6, reference numeral $18_1$ denotes a converging lens; $18_2$, a reflecting plane; and $18_3$, a mask.

Moreover, as shown in FIG. 7, the lens shown in FIG. 6 is constituted by a gradient index lens, for example, under the trademark of SELFOC MICRO LENS (made by Nippon Sheet Glass Co., Ltd.) and a reflection mirror is formed solely on the center of its flat surface by vapor deposition, it is possible to provide the same effect as that of the system shown in FIG. 6, and thus the production becomes easy and the entire system can be made small and simple. In FIG. 7, reference numeral $19_1$ denotes a gradient index lens and reference numeral $19_2$ denotes a reflection portion (reversed mirror).

In the present invention, instead of a plurality of diffracted beams, a single diffracted beam as shown in FIG. 8 may be used. In the embodiment shown in FIG. 8, a single particular diffracted order beam is extracted and superposed on the beam reflected by a reflection mirror 20, and is introduced into the light receiving elements $8_1$, $8_2$, thereby obtaining sinusoidalwave signals.

Referring more specifically to FIG. 8, the beam emitted from the laser 1 is converted into a substantially parallel beam of light by the collimator lens 2, and is split into a reflected beam and a transmitted beam by the polarizing beam splitter 11.

The ratio of the intensities of the reflected beam and the transmitted beam which the polarizing beam splitter 11 splits is determined by the relationship between the axis of polarization of the beam emitted from the laser 1 and that of the splitting plane of the polarizing beam splitter 11.

The beam reflected by the polarizing beam splitter 11 is converted into a circularly polarized beam by the quarter-wave plate $4_1$, and is made incident on the diffraction grating 3 by which it is diffracted. A particular diffracted order beam generated at this time is converged onto the reflection mirror 14 by the converging lens 13 and the mask 15. After the beam has been reflected by the reflection mirror 14, it is returned along the same optical path and is again made incident on the diffraction grating 3.

When the beam is again made incident on the diffraction grating 3, it is re-diffracted by the grating 3, and the beam thus re-diffracted is linearly re-polarized by the quarter-wave plate $4_1$, thus passing through the polarizing beam splitter 11.

On the other hand, the other beam which is made incident onto and transmitted through the polarizing beam splitter 11 via the collimator lens 2 is circularly polarized by the quarter-wave plate $4_2$, and then made incident on the reflection mirror 20. The beam is returned along the same optical path after reflection from the reflection mirror 20 and is linearly polarized via the quarter-wave plate $4_2$. The beam is reflected by the polarizing beam splitter 11 and is superposed on the aforementioned re-diffracted beam which is passed through the polarizing beam splitter 11.

This embodiment shown in FIG. 8 achieves a linear encoder having a far smaller and simpler construction than that of the embodiment shown in FIG. 3.

Incidentally, the diffraction grating used in the present invention is a so-called amplitude type diffraction grating including light cutoff portions and light transmitting portions, or a phase type diffraction grating including portions whose refractive indexes differ from each other. Specifically, the latter phase type diffraction grating (or phase grating) can be obtained, for example, by forming a rugged relief pattern along the periphery of a transparent disc, and this feature is therefore effective in that diffraction gratings can be produced by a mass production process such as stamping or embossing. In addition, reflectiontype phase gratings can be easily produced by forming a reflection film on the rugged pattern by vapor deposition.

As can be seen from the foregoing, in accordance with the present invention, the utilization of the beam converging systems each having a reflection plane in the vicinity of its focal point enables accomplishment of a high-precision linear encoder of the type in which the overall size is reduced and the production is easy.

FIG. 9 is a diagrammatic view of an optical system, showing a first preferred embodiment of a rotary encoder in accordance with the present invention.

A conventional type of photoelectrical rotary encoder has a so-called index scale system including a main scale and a fixed index scale, the main scale being constituted by light transmitting portions and light cutoff portions arranged at equal intervals along the periphery of a disc associated with a rotary shaft and the fixed index scale being constituted by light transmitting portions and light cutoff portions at equal intervals corresponding to those of the main scale. The main and index scales are disposed face-to-face with each other and are interposed between light emitting means and light receiving means. In this system, since it is possible to obtain a signal in synchronism with the intervals between the light transmitting and cutoff portions in the two scales with rotation of the main scale, variations in the rotational speed of the rotary shaft are detected by analyzing the frequency of the signal. For this reason, as the scale intervals between the light transmitting and cutoff portions are reduced, the accuracy of detection can be enhanced. However, the reduction in the scale intervals involves disadvantages in that the influence of the diffracted beam lowers the S/N ratio of the output signal from the light receiving means, so that the accuracy of detection is descreased. Accordingly, if the number of gratings forming the light transmitting and cutoff portions in the main scale is fixed in total and the intervals between the transmitting and cutoff portions are to be enlarged to the extent that they are not affected by the diffracted beam, the diameter of the disc of the main scale is increased, thereby further increasing the thickness of the disc of the main scale and thus the overall size of the system, with the result that an increasingly large load is applied to the rotating object to be measured.

However, each rotary encoder shown in FIGS. 9 to 19 is a system in which a load applied to the rotating object to be measured is small and a sufficient reduction in size can be achieved, and yet which has a high resolution.

Referring back to FIG. 9, the illustrated rotary encoder includes a source of coherent light such as a laser, a collimator lens 31, and polarizing beam splitters 32, 33, the splitters 32, 33 being disposed so that their respective axes of polarization are shifted 45° with respect to the linearly-polarized beam from the laser 30. The illustrated encoder also includes quarter-wave plates 4₁ to 4₄, cylindrical lenses 51 to 54, a diffraction grating 61 constituted by a disc on which, for example, a grating pattern of transmitting portions and reflecting portions is formed at a equal central angle, and a rotary shaft 70 of a rotating test piece (not shown). The encoder further includes reflection mirrors 91, 92, a half-wave plate 100, a beam splitter 110, polarizing plates 121, 122, light receiving elements 131, 132, convergent concave lenses 141, 142, reflection mirrors 151, 152 disposed in the vicinity of the focal plane of the concave lenses 141, 142 and beam limiting masks 161, 162 disposed at the front of the respective mirrors 151, 152.

In this embodiment, a combination of the concave lens 141, the reflection mirror 151 and the mask 161 constitutes an optical system as a part of reflection means.

The operation of the rotary encoder shown in FIG. 9 will be described below. The beam emitted from the laser 30 is collimated into a substantially parallel beam of light by the collimator lens 31, then made incident on the polarizing beam splitter 32 by which it is transmitted and reflected with a substantially equal quantity of light. The transmitted beam is circularly polarized by the quarter-wave plate 41 and lineally illuminates a position $M_1$ on the diffraction grating 61 through the cylindrical lens 51.

The cylindrical lens 51 is suitably arranged to lineally illuminate the diffraction grating 61 with a beam of light in the direction normal to the radial direction of the grating 61. This linear illumination enables a reduction in a pitch error of the grating pattern constituted by the transmitting and reflecting portions corresponding to the portion of the diffraction pattern 61 which is illuminated by the beam.

The beam which lineally illuminates the position $M_1$ of the diffraction grating 61 is diffracted by the diffraction grating 61 into a particular diffracted order beam, and is formed into a substantially parallel beam of light by the cylindrical lens 52, thus being made incident on the convex lens 141 forming a part of the optical system. Since the reflection mirror 151 is substantially disposed in the focal plane of the convex lens 141, the beam incident on the convex lens 141 in a parallel form is converged onto the reflection mirror 151 through the mask 16₁. The thusconverged beam is reflected by the reflection mirror 151, being returned along the same optical path, and again illuminating the position $M_1$ of the diffraction grating 61. The beam which is again diffracted at the position $M_1$ is passed through the quarter-wave plate 41, and is reflected by the polarizing beam splitter 32 toward the quarter-wave plate 42. The reflected beam is further reflected by the polarizing beam splitter 91 via the quarter-wave plate 42, and is again transmitted via the same plate 42 through the polarizing beam splitter 32 toward the half-wave plate 100. The axis of polarization of the beam is shifted through 90° by the half-wave plate 100, being reflected by the polarizing beam splitter 33 toward the quarter-wave plate 45. The reflected beam, passed through the quarter-wave plate 45, is split into two beams by the beam splitter 110, then received by the light receiving elements 131, 132 via the polarizing plates 121, 122, respectively.

On the other hand, the beam which is emitted from the laser 30 and is reflected by the polarizing beam splitter 32 is passed through the half-wave plate 100, by which the axis of polarization of the beam is shifted through 90°. The beam is transmitted through the polarizing beam splitter 33, then circularly polarized by the quarter-wave plate 43 and proceeding toward the reflection mirror 92. After the circularlypolarized beam has been reflected by the mirror 92, it is again linearly polarized by the quarter-wave plate 43, and then is reflected by the polarizing beam splitter 33. The reflected beam, passed through the quarter-wave plate 44 and the cylindrical lens 53, lineally illuminates a position $M_2$ of the diffraction grating 61.

It should be noted that the positions $M_1$ and $M_2$ are substantially in symmetrical positional relationship with respect to the rotation axis 0 of the rotating test piece.

A particular diffracted order beam $L_2$ of the beams which are diffracted at the position $M_2$ is formed into a substantially parallel beam of light by the cylindrical lens 54, in the same manner as in the case of a diffracted beam $L_1$ described above. The parallel beam of light is made incident on the convex lens 142, then converged on the reflection mirror 152 by the beam limiting mask 162. The thus-converged beam is reflected by the mirror 152 and is returned along the same optical path, thus again illuminating the point $M_2$ of the diffraction grating 61. The beam which is re-diffracted at the point $M_2$ is further returned along the same optical path, then transmitted through the polarizing beam splitter 33 in which it is superposed on the diffracted beam $L_1$ from the position $M_1$. The superposed beam is split into two beams by the splitter 33 and the respective split beams are received by the light receiving elements 131, 132. As the rotating test piece is turned, the frequency of the diffracted beam $L_1$ at the position $M_1$ is shifted by $\Delta f = r\omega \sin\theta_m/\lambda$, where r represents the distance between the rotation axis 0 and the position $M_1$, $\omega$ representing the angular velocity, $\theta_m$ representing the angle of diffraction of the m-order diffracted beam $L_1$, and $\lambda$ representing the wavelength of the laser 1.

Since the diffracted beam $L_1$ is reflected by the reflection means and is again diffracted at the position $M_1$, when it is made incident on the light receiving elements 131, 132, the frequency thereof is shifted by 2 $\Delta f$. Similarly, when the diffracted beam $L_2$ at the position $M_2$ is made incident on the light receiving elements 131, 132, the frequency thereof is shifted by $-2 \Delta f$.

Accordingly, the frequencies of the output signals from the light receiving elements 131, 132 are represented by 4 $\Delta f$. Also, if the pitches of the grating patterns at the positions $M_1$, $M_2$ are respectively represented by P, $\sin \theta_m = m\lambda/P$ is obtained from diffraction conditions, and the frequency of the output signal from the light receiving element is therefore $F = 4\Delta f = 4mr\omega/P$.

If the total number of grating patterns of the diffraction grating 61 is N and a constant angular pitch is $\Delta$, $F = 2mN\omega/\pi$ is obtained from $P = r\Delta\psi$, $\Delta\psi = 2\pi/N$. Here, if the wave number of the output signal of the light receiving element during a time $\Delta t$ is n and the angle of rotation of the diffracted grating 61 during the time $\Delta t$ is $\theta$, the following equation (1) is obtained from $n = F\Delta t$, $\theta = \omega\Delta t$;

$$n = 2mN\theta/\pi. \quad\quad (1)$$

Consequently, the angle of rotation $\theta$ of the diffraction grating 61 is calculated from the equation (1) by counting the wave number n of the output signals from the respective light receiving elements. In the embodiment shown in FIG. 9 which is constructed as described above, the use of a diffracted beam allows a small-diameter, fine grating to be employed as the diffraction grating 61. Therefore, this embodiment possesses the advantage that the diameter of the entire system is reduced and no large load is applied to the rotating test piece. In addition, the convex lenses 141, 142 and the reflection mirrors 151, 152 are used as reflection means for again illuminating the positions $M_1$, $M_2$ with the diffracted beams $L_1$, $L_2$. Therefore, as compared with the case where corner cube reflection mirrors are used, it is possible to intimately dispose the reflection means and the diffraction grating 61 and also to reduce production costs.

Specifically, the diffraction angles of the diffracted beams $L_1$, $L_2$ are varied in the case where, since the wavelength of the beam incident on the diffraction grating 61 is varied by changes in ambient temperature or the rotation axis 0 of the rotating test piece does not agree with the rotation axis 0 of the diffraction grating 61, the pitch of the grating pattern is varied at the beam incidence positions $M_1$, $M_2$ with rotation of the diffraction grating 61.

However, in accordance with the present invention in which the optical system as reflection means is arranged as described above, after the beams incident on the convex lenses 141, 142 have been reflected by the reflection mirrors 151, 152, it is possible to make the beams exit from the convex lenses 141, 142 at an equal angle to the respective incidence angles, so that the reflected beams can be returned along the same respective optical paths. In addition, the provision of the beam limiting masks 161, 162 disposed just before the corresponding reflection mirrors 151, 152 enables elimination of diffracted beams such as the zero diffracted order beam or any diffracted beams other than the particular diffracted order beams $L_1$, $L_2$. This makes it possible to reduce the distance between the diffraction grating 61 and each group of the reflection means 141, 142, the reflection mirrors 151, 152 and the masks 161, 162. For example, if the pitch of the grating pattern at the positions $M_1$, $M_2$ is 10 $\mu$m and the wavelength of the incident beam is 0.83 $\mu$m and the first diffracted order beam is to again illuminate the diffraction grating 61 by using a flat-convex micro lens of a 3 mm radius as each of the convex lenses 141, 142, the zero diffracted order beam is made incident on the micro lenses 141, 142 at an angle of 4.8° to the first diffracted order beam. Accordingly, if the apertures in the beam limiting masks 161, 162 are respectively formed to have a radius of (the focal length of the micro lens=6 mm)×( tan 4.8°)=0.5 mm or less, the zero diffracted order beam can be eliminated. Here, a distance of about 15 mm between the diffraction grating 61 and the reflection mirrors 151, 152 is sufficient. In addition, it is possible to easily produce any of the convex lenses 141, 142, the reflecting mirrors 151, 152 and the beam limiting masks 161, 162. For example, there is an advantage in that production costs can be lowered as compared with the case where corner cube reflection mirrors are used, as described previously.

It should be noted that, the reflection mirrors 151, 152 may be constituted by concave mirrors having the curvature centers as the nodal points of the convex lenses 141, 142 described later instead of flat mirrors. It is preferable that the optical systems as reflection means are, as shown in FIG. 6, integrally constituted by convex lenses and masks, whereby the entire system can be simplified.

Moreover, as shown in FIG. 7, the convex lens shown in FIG. 6 is constituted by a gradient index lens, for example, under the trademark of SELFOC MICRO LENS (made by Nippon Sheet Glass Co., Ltd.) and a reflection plane is formed by vapor deposition solely on the center of its flat surface, the production becomes easy and the entire system becomes small and simple.

Although this embodiment refers to the use of a diffracted beam which is transmitted, the objects of the present invention can be achieved similarly by using a diffracted beam which is reflected.

As described above, in accordance with this embodiment, the use of the reflection means including the optical systems having the reflection surfaces disposed in their focal plane achieves a high precision rotary encoder in which no large load is applied to the rotating test piece and yet the entire size can be reduced.

It should be noted that, as in the case of the previously-described linear encoder, the rotary encoder of this embodiment is arranged in such a manner that the optical path lengths of two diffracted beams to be superposed are the same as each other, and this therefore constitutes optical systems substantially free from the influence of disturbance.

Figure 10:
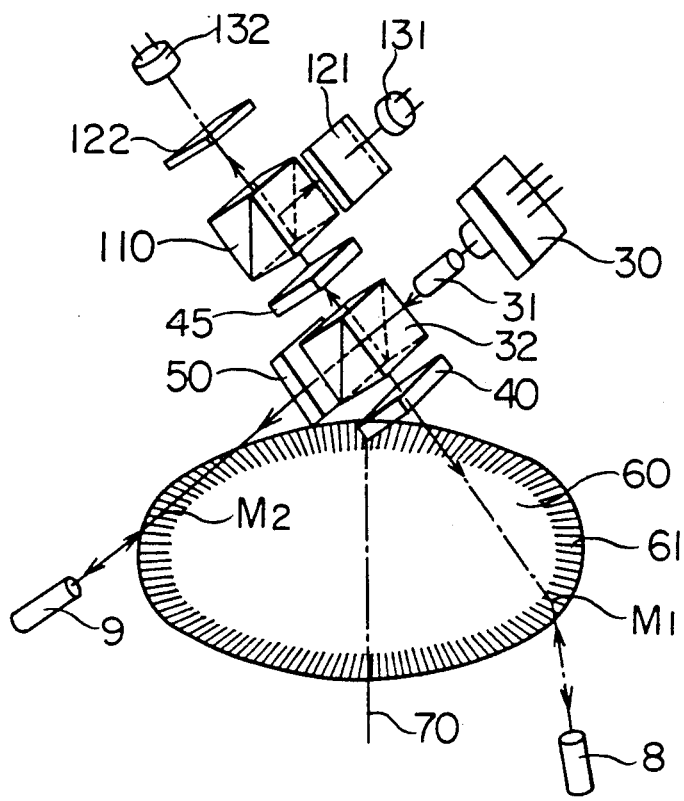
FIG. 10 is a perspective view diagrammatically showing a second preferred embodiment of a rotary encoder in accordance with the present invention.

FIG. 10 is a perspective view of a second embodiment of a rotary encoder in accordance with the present invention.

The rotary encoder shown in FIG. 10 is a system of the type in which the rotary encoder shown in FIG. 9 is further simplified and miniaturized.

In FIG. 10, like reference numerals are used for simplicity to denote like or corresponding circuit elements which constitute each of the components shown in FIG. 9. In FIG. 10, reference numerals 40, 50 denote quarter-wave plates, reference numeral 60 denotes a disc and reference numerals 8 and 9 denote reflection means shown in FIG. 7.

In accordance with this second embodiment, the beam emitted from the laser 30 is collimated into a parallel beam by the collimator lens 31, and is made incident on the beam splitter 32, by which it is split into two linearly polarized beams: a reflected beam and a transmitted beam with a substantially equal quantity of light. The reflected beam is circularly polarized via the quarter-wave plate 40, then made incident on the position $M_1$ on the disc 60 which is coupled with a rotating object to be measured, radial diffraction gratings being formed on the disc 60. A particular diffracted order beam of transmitted beam diffracted from the diffraction grating 61 is reflected from the reflection means 8, and is returned along the same optical path. The beam is again made incident on substantially the same position $M_1$ on the diffraction grating 61. The particular order beam re-diffracted from the diffraction grating 61 is made incident on the polarizing beam splitter 32 in linearly-polarized form via the quarter-wave plate 40 with the axis of polarization being shifted through 90° with respect to that at the time of the preceding incidence.

In this second embodiment, the particular diffracted order beam passes forwardly and backwardly along the same optical path between the polarizing beam splitter 32 and the reflection means 8. Also, the use of the reflection means 8, 9, as described previously, enables the diffracted beam to return along substantially the same optical path even if the angle of diffraction is more or less varied by variations in the oscillation wavelength of the laser beam.

Referring back to FIG. 10, the transmitted beam of the two split beams formed by the polarizing beam splitter 32 is circularly polarized via a quarter-wave plate 50. The circularly polarized beam is made incident on the position $M_2$ which is in substantial point symmetry relative to the position $M_1$ on the diffraction grating 61 on the disc 60 about the axis of the rotary shaft 70. A particular order beam of the transmitted beam diffracted from the diffraction grating 61 is returned along the same optical path by the reflection means 9 similar to the previously described reflection means 8, the returned beam being again made incident on substantially the same position $M_2$ of the diffraction grating 61. The particular diffracted order beam which is again diffracted from the diffraction grating 61 is made incident on the polarizing beam splitter 32 in linearly polarized form via the quarter-wave plate 50 with the axis of polarization being shifted through 90° with respect to that at the time of the preceding incidence.

At this time, as in the case of the previously described reflected beam, the particular diffracted order beam derived from the transmitted beam is also passed forwardly and backwardly along the same optical path between the polarizing beam splitter 32 and the reflection means 9. After this diffracted beam has been superposed on the diffracted beam entering from the reflection means 8, the superposed beam is circularly polarized by the quarter-wave plate 45, then split into two beams by the beam splitter 110. These respective beams are passed through the polarizing plates 121, 122 which are disposed with their axis of polarization being inclined at 45° with respect to each other, and are linearly polarized with a phase difference of 90° between the two beams. The respective linearly-polarized beams are made incident on the corresponding light receiving means 131, 132, and detection is made with respect to the intensity of the interference fringes of the two beams produced by the light receiving means 131, 132.

In this second embodiment as well, as the disc 60 is rotated by one pitch of the diffraction grating 61, the phase of the beam diffracted into order "m" varies by 2 m$\pi$. Similarly, the beam which is rediffracted into order "n" from the diffraction grating 61 is varied by 2 n$\pi$. As a result, the light receiving means provide sinusoidal waveforms of (2 m−2 n) in total. In this embodiment, the amount of rotation is measured by detecting these sinusoidal waveforms.

As an example, if the diffraction grating pitch is 3.2 $\mu$m and beams diffracted into "±1" orders are utilized, when the rotating object is rotated by a pitch of 3.2 $\mu$m, the light receiving elements provide four sinusoidal waveforms in total. Specifically, the resolution per sinusoidal waveform is 3.2/4 = 0.8 $\mu$m equivalent to a quarter of one pitch of the diffraction grating.

In this second embodiment as well, the beam is split into two beams by the beam splitter 110, and the polarizing plates 131, 132 provide a 90° phase difference between the two beams, so that it is also possible to discriminate the direction of rotation of the rotating object.

Incidentally, if the sole amount of rotation is to be measured, it is unnecessary to use the beam splitter 110, the polarizing plates 121, 122 nor either of the light receiving means 131 and 132.

In this second embodiment, measurement errors based on the eccentricity between the rotation axis of the rotating object and the center of the diffraction grating can be reduced by using the beam diffracted from the positions $M_1$, $M_1$ located in point symmetry relative to the rotation axis.

It is to be noted that, although the arrangement according to the second embodiment utilizes the light diffracted from the points $M_1$, $M_2$ in substantially point symmetrical relationship with each other, it is possible to achieve substantially the same effect by using a beam diffracted from a plurality of positions, in addition to that of the point-symmetrical positions. As an example, it is effective to utilize a beam diffracted from three positions spaced apart by 120° with respect to one another.

In addition, two beams are superposed on each other in such a manner that the beam element of the one beam nearer the center of the rotating shaft is superposed on the beam element of the other beam nearer the center of the rotating shaft and similarly the beam elements of these beams away from the rotation center are superposed on each other, thereby eliminating the influence of the wavefront aberration derived from the difference between the pitches on the inner and outer sides.

Moreover, in the second embodiment, the particular diffracted order beam is passed forwardly and backwardly along the same optical path between the polarizing beam splitter 32 and the corresponding reflection means 8 and 9, so that the two beams can be easily superposed on each other in the polarizing beam splitter 32, and this improves the accuracy of assembly of the entire system.

FIGS. 11 to 14 schematically show the third to sixth embodiments of the optical system in accordance with the present invention. In Figures which will be referred to later, like reference numerals are used to denote like or corresponding circuit elements which constitute each of the components shown in FIG. 10.

Figure 11:
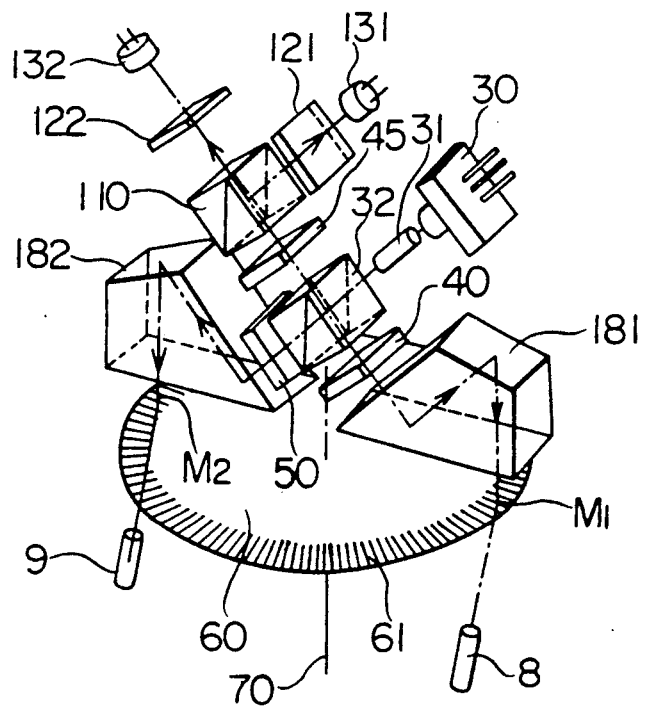
FIG. 11 is a perspective view diagrammatically showing a third preferred embodiment of the rotary encoder in accordance with the present invention.

In the third embodiment shown in FIG. 11, prisms 181, 182 of an internal reflection type having two reflection planes are disposed between the polarizing beam splitter 32 and the diffraction grating 61 which are incorporated in the embodiment shown in FIG. 1, so that the length in the direction of the axis of the rotating shaft 70 is reduced, thereby decreasing the overall size of the system and improving the accuracy of assembly. Also, the incidence angle of light onto the diffraction grating 61 is set to be substantially normal to the lines of the grating.

It is to be noted that in the third embodiment, the quarter-wave plate 40 may be disposed between the prism 181 and the diffraction grating 61. This arrangement is applied to the other quarter-wave plate 50.

Figure 12:
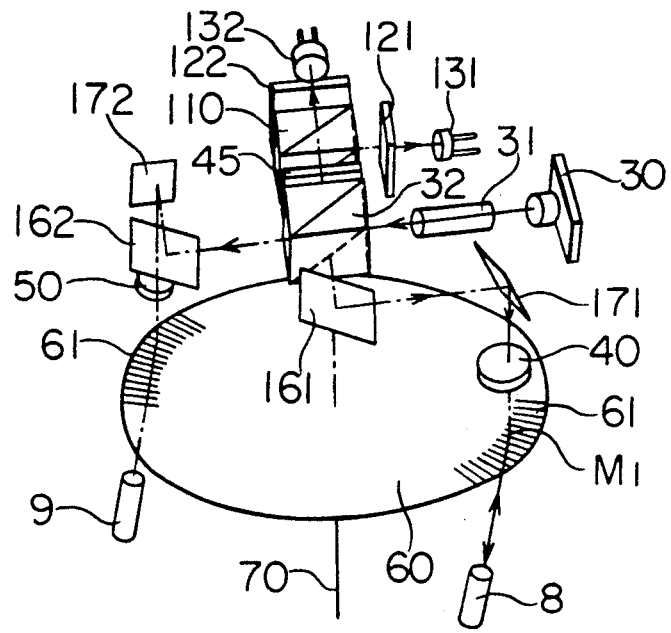
FIG. 12 is a perspective view diagrammatically showing a fourth preferred embodiment of the rotary encoder in accordance with the present invention.

Referring to the fourth embodiment shown in FIG. 12, reflection mirrors 161, 162, 171 and 172 are disposed between the polarizing beam splitter 32 and the diffraction grating 61, and the beam emitted from the laser 30 is introduced in a lateral direction, whereby the axial length of the rotating shaft is further reduced and the entire system is reduced in size.

Figure 13:
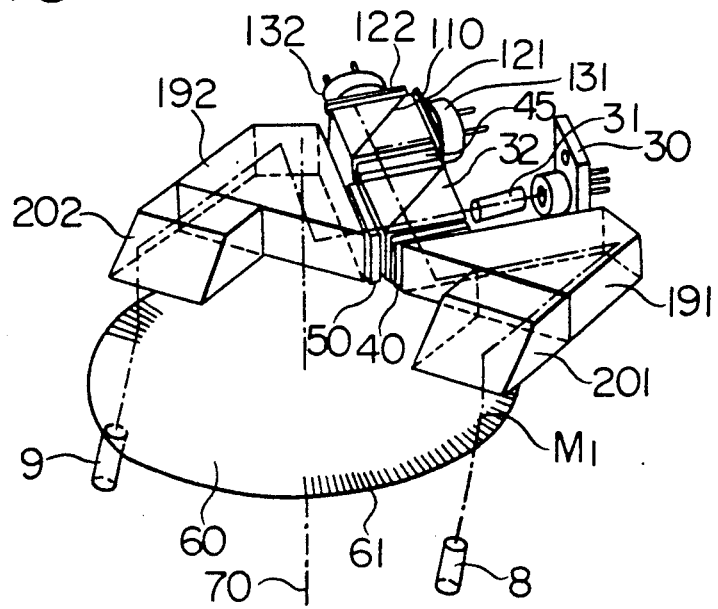
FIG. 13 is a perspective view diagrammatically showing a fifth preferred embodiment of the rotary encoder in accordance with the present invention.

Referring to the fifth embodiment shown in FIG. 13, internal-reflection type prisms 191, 192, 201 and 202 are employed, instead of the reflection mirrors 161, 162, 171 and 172 used in the fourth embodiment shown in FIG. 12. The prisms 191, 192 all are respectively constructed so as to have two reflection planes, thereby increasing the tolerances of mounting the prisms 191, 192. Moreover, since the laser and the prisms are disposed in substantially the same plane, the system is reduced in both size and width.

Figure 14:
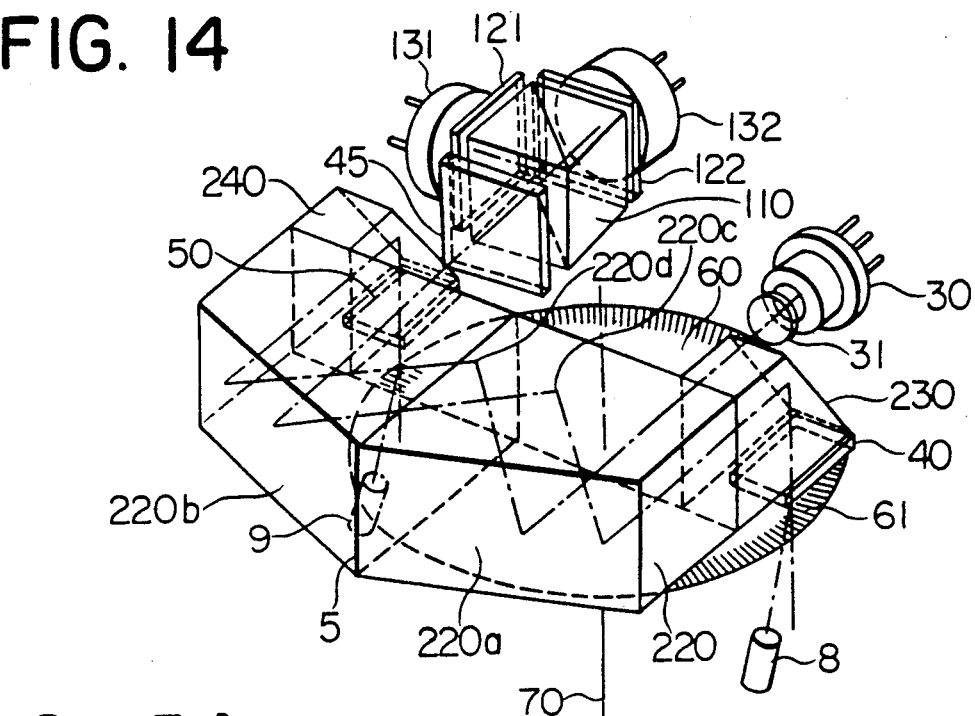
FIG. 14 is a perspective view diagrammatically showing a sixth preferred embodiment of the rotary encoder in accordance with the present invention.

Referring to FIG. 14 illustrating the sixth embodiment, there is shown a case where a prism 220 performs the functions of both the polarizing beam splitter and the internal-reflection type prism. In the sixth embodiment, the beam from the laser 30 enters the polarizing prism 220 via the collimator lens 31, and, after the beam has been reflected from an internal plane 220a and has been made incident on a polarizing surface S, it is split into two beams each having a different axis of polarization. The beam of the two which is reflected from the polarizing plane S is further reflected from an inner surface 220c to another inner surface 220a. The beam reflected from the inner surface 220a is made incident on the diffraction grating 61 via the quarter-wave plate 40. The incident beam is diffracted from the diffraction grating 61, then reflected from the reflection means 8 and again diffracted from the diffraction grating 61. The re-diffracted beam is passed through the quarter-wave plate 40 and the prism 230 into the polarizing prism 220. The beam in the prism 220 is reflected from the inner planes 220a and 220c, and, after the reflected beam has been transmitted through the polarizing planes S, it exits from the polarizing prism 220 after reflection from an inner plane 220b. Subsequently, in the same manner as in the case shown in FIG. 11, the beam is made incident on the light receiving means 131 and 132 through the quarter-wave plate 45, the beam splitter 110, the polarizing plates 121 and 122.

On the other hand, the beam transmitted through the polarizing planes S is reflected from the inner planes 220b and 220d, and, after the reflected beam exits from the polarizing prism 220, it is made incident on the diffraction grating 61 via a prism 240 and the quarter-wave plate 50. The beam diffracted from the diffraction grating 61 is reflected from the reflection means 9, and is again diffracted from the same grating 61. The re-diffracted beam is passed through the quarter-wave plate 50 and the prism 240 into the polarizing prism 220. After the beam has been reflected among the inner surfaces 220b, 220d and the polarizing plane S, it is further reflected from the inner plane 220b and exits from the polarizing prism 220. Subsequently, similar to the embodiment shown in FIG. 11, the beam is made incident on the light receiving means 131, 132 through the quarter-wave plate 45, the beam splitter 110, and the polarizing plates 121 and 131.

In the sixth embodiment, reflection mirrors may be substituted for the prisms 230 and 240.

In this embodiment, the use of the polarizing prism 220 of a particular shape reduces the number of optical parts used, improving the accuracy of mounting the respective optical parts and reducing the overall size of the system.

It should be noted that, in each of the abovedescribed embodiments, the quarter-wave plates 40 and 50 may be freely disposed anywhere between the reflection means 220 and the polarizing beam splitter 32 or the polarizing prism 220.

In addition, in any of the embodiments, a diffracted beam which is reflected may be substituted for a diffracted beam which is transmitted.

The diffraction grating used in the sixth embodiment is also of an amplitude type diffraction grating including light transmitting and cutoff portions or of a phase type diffraction grating including portions having refractive indexes different from each other. In particular, the phase type diffraction grating can be produced, for example, by forming a rugged relief pattern along the periphery of a transparent disc, with the result that mass production is enabled by a process such as embossing or stamping.

In accordance with the respective embodiments, a particular diffracted order beam is passed forwardly and backwardly along substantially the same optical path between the polarizing beam splitter and the reflection means, with the result that the superposition of the diffracted beams is facilitated and the state of rotation of a rotating object can be measured with high precision, and yet it is possible to achieve a rotary encoder in which the entire system is reduced in size.

Figure 15A:
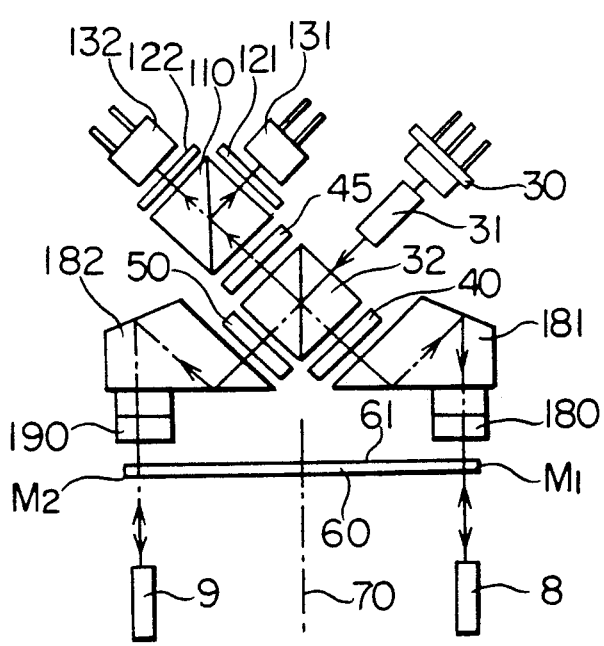
FIGS. 15A and 15B are respectively a front elevational view and a side elevational view diagrammatically showing a seventh preferred embodiment of the rotary encoder in accordance with the present invention.
Figure 15B:
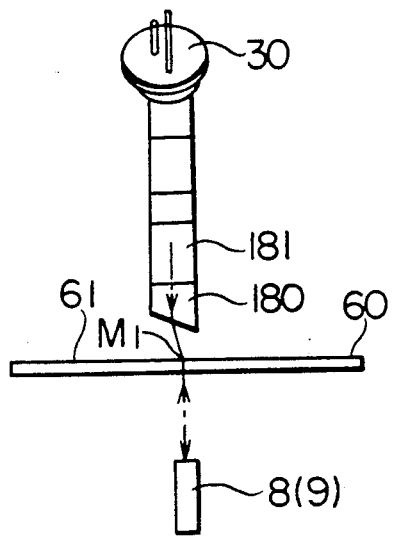

FIGS. 15A and 15B are respectively diagrammatic views of the seventh embodiment of the rotary encoder in accordance with the present invention, showing a modification shown in perspective in FIG. 11. FIGS. 15A and 15B respectively are a front elevational view and a side elevational view of the encoder.

In FIGS. 15A and 15B, like reference numerals are used for the sake of simplicity to denote like or corresponding elements which constitute each of the components shown in FIG. 11. In FIGS. 15A and 15B, reference numerals 180 and 190 denote trapezoidal transparent optical members which are respectively bonded to the prisms 181, 182.

In this seventh embodiment, the beam emitted from the laser 30 is collimated into a parallel beam by the collimator lens 31, then entering the beam splitter 32, in which it is split into two linearly polarized beams: a reflected beam and a transmitted beam each having an equal quantity of light. The reflected beam of the two is circularly polarized via the quarter-wave plate 40, passing through the prism 181 having two reflection planes and being made incident on the optical member 18 including a prism. The incident beam enters via the optical member 180 the position $M_1$ of the diffraction grating 61 which is radially formed on the disc 60 coupled with the rotating object to be measured. At this time, the beam which exits from the prism 181 in the direction perpendicular to the lines of the diffraction grating 61 is made incident on the diffraction grating 61 so that a beam diffracted into a particular order from the diffraction grating 61 may exit from the diffraction grating 61 in the direction substantially perpendicular thereto, by determining the configuration of the optical member 180 as shown in FIG. 15B. Thus, the particular diffracted order beam which is transmitted through the diffraction grating 61 is introduced toward the reflection means 8. The reflection means 8 includes, for example, a beam convergent member such as a convergent lens and a reflection mirror constituted by a flat mirror or a curved mirror. The reflection means 8 is arranged in such a manner that the primary rays of the diffracted incident beam passed through the convergent member are reflected from the reflection mirror, and is then returned along substantially the same optical path as that of the preceding incidence. Thus, the diffracted beam introduced into the optical means 8 is returned along substantially the same optical path as its incidence path, then being again made incident on substantially the same position $M_1$ on the diffraction grating 61. The particular order beam which is re-diffracted from the diffraction grating 61 is lineally polarized via the quarter-wave plate 40 with the axis of polarization being shifted through 90° with respect to that at the time of the preceding incidence, and is made to enter the polarizing beam splitter 32.

In this seventh embodiment, the particular diffracted order beam is passed forwardly and backwardly along the same optical path between the polarizing beam splitter 32 and the reflection means 8.

Similarly to the respective previously-described embodiments, this embodiment as well may be provided with the reflection means 8, 9 which are constructed as shown in FIGS. 5 to 7.

Referring back to FIGS. 15A and 15B, the transmitted beam of the two split beams which are generated by the polarizing beam splitter 32 is circularly polarized via the quarter-wave plate 50, being passed through the prism 182 including two reflection planes, and entering the optical member including a prism. The beam is made incident via the optical member 190 on the position $M_2$ of the diffraction grating 61 of the disc 60, the position $M_2$ being in point symmetry relation to the position $M_1$ on the diffraction grating 61 with respect to the rotating shaft 70. At this time, the beam which exits from the prism 181 in the direction perpendicular to the lines of the diffraction grating 61 is made incident on the diffraction grating 61 so that a beam diffracted into a particular order from the diffraction grating 61 may exit from the diffraction grating 61 in the direction substantially perpendicular thereto, by determining the configuration of the optical member 190 in the same manner as in the case of the above-described reflected beam. The particular-order beam which is transmitted through the diffraction grating 61 after diffraction is returned along the same optical path by the reflection means 9 similar to the reflection means 8, being again made incident on substantially the same position $M_2$ of the diffraction grating 61. The particular-order beam which is re-diffracted from the diffraction grating 61 is linearly polarized via the quarter-wave plate 50 with the axis of polarization being shifted through 90° with respect to that at the time of the preceding incidence, and is made to enter the polarizing beam splitter 32.

In the case of the transmitted beam as well, similar to the previously-described reflected beam, the beam diffracted into a particular order is passed forwardly and backwardly along the same optical path between the polarizing beam splitter 32 and the reflection means 9. The beam reflected from the means 9 is superposed on the diffracted beam entering from the reflection means 8 in the polarizing beam splitter 32, and the beam superposed is circularly polarized via the quarter-wave plate 45. After the circularly polarized beam has been split into two beams by the beam splitter 110, the respective beams pass through the polarizing plates 121, 122, which are disposed with the axis of polarization being shifted at 45° with respect to each other, are linearly polarized with a 90° phase difference therebetween and then being made incident on the corresponding light receiving means 131, 132. In consequence, detection is made with respect to the intensity of the interference fringes of the two beams formed via the light receiving means 131, 132.

In this seventh embodiment, as the rotating object to be measured is turned by one pitch of the diffraction grating 61, a beam diffracted into order "m" is varied by $2m\pi$ in phase. Similarly, the beam re-diffracted into order "n" from the diffraction grating 61 is varied by $2n\pi$. In consequence, the light receiving means provide sinusoidal waveforms of $(2m-2n)$ in total. In this embodiment, these sinusoidal waveforms are detected, thereby measuring the amount of rotation of the object.

For example, if the pitch of the diffraction is 3.2 μm and the beam diffracted into "±1" order is utilized, when the rotating object is turned by a pitch of 3.2 μm, the light receiving means provide four sinusoidal waveforms in total. Specifically, the resolution per sinusoidal waveform is a quarter of one pitch of the diffraction grating, that is, $3.2/4=0.8$ μm.

In this embodiment, the beam is split into two beams by the beam splitter 11, and the direction of rotation of the object can also be discriminated by establishing a 90° phase difference between the two beams.

It is to be noted that, if the sole amount of rotation is measured, it is unnecessary to use the beam splitter 110, the polarizing plates 121, 122 nor either of the light receiving means 131 and 132.

Figure 16:
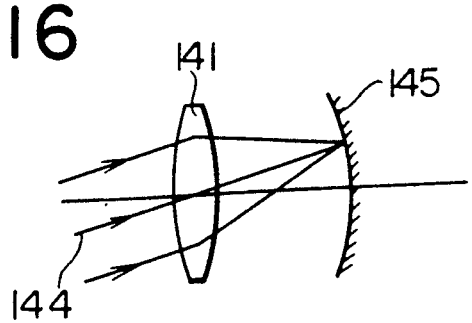
FIG. 16 is a diagrammatic illustration of another example of the construction of the reflection means in accordance with the present invention.

In FIG. 16, the concave mirror 145 is disposed so that its curvature center may agree with the exit pupil of the convergent material 141, and thus a primary ray 144 of the particular diffracted order beam incident on the convergent material at given angles is returned along substantially the same optical path as that at the time of preceding incidence. This arrangement reduces errors in assembly and improves measurement accuracy.

In this seventh embodiment, measurement errors based on the eccentricity between the rotation axis of the rotating object and the center of the diffraction grating can be reduced by using the beam diffracted from the positions $M_1$, $M_1$ located in point symmetry relative to the rotation axis.

It is to be noted that, although the arrangement according to the seventh embodiment utilizes the beam diffracted from the points $M_1$, $M_2$ in substantially point symmetrical relationship with each other, it is possible to achieve substantially the same effect by using a beam diffracted from a plurality of positions, in addition to that from the point-symmetrical positions. As an example, it is effective to utilize beams diffracted from three positions spaced apart by 120° with respect to one another.

In addition, two beams are superposed on each other in such a manner that the beam element of the one beam nearer the axis of the rotating shaft is superposed on the beam element of the other beam nearer the center of the rotating shaft and similarly the beam elements of these beams away from the rotation axis are superposed on each other, thereby eliminating the influence of the wavefront aberration derived from the difference between the pitches on the inner and outer sides.

Moreover, in the seventh embodiment, the particular diffracted order beam is passed forwardly and backwardly along the same optical path between the polarizing beam splitter 32 and the corresponding reflection means 8 and 9, so that the two beams can be easily superposed on each other in the polarizing beam splitter 32, and this improves the accuracy of assembly of the entire system.

FIG. 16 is an illustration of another example of each of the reflection means 8, 9 of the present invention shown in FIGS. 15A and 15B.

In addition to the arrangements in the abovedescribed embodiments, the reflection means in this embodiment may be arranged in any manner that a diffracted ray equivalent to the primary ray of the beams diffracted from the diffraction grating is returned along substantially the same optical path as the incidence optical path.

The use of such optical means provides the advantage that, for example, even if variations in the oscillation wavelength of a laser beam more or less alter the angle of diffraction, the beam can follow substantially the same optical path.

Figure 17A:
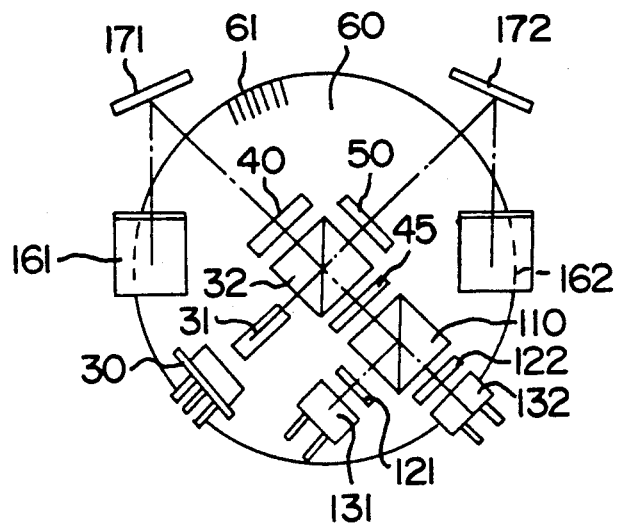
FIGS. 17A and 17B are respectively a front elevational view and a side elevational view diagrammatically showing an eighth preferred embodiment of the rotary encoder in accordance with the present invention.
Figure 17B:
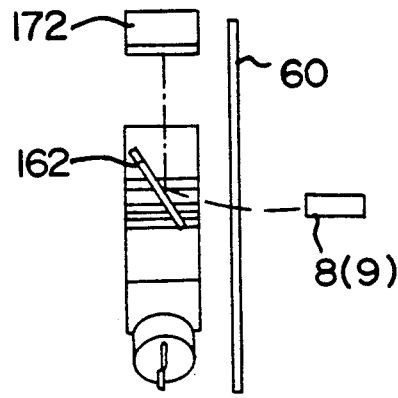

FIGS. 17A and 17B respectively illustrate the eighth embodiment of the rotary encoder of the present invention, showing diagrammatically a modification of the rotary encoder shown in perspective in FIG. 12.

FIG. 17A and 17B are respectively a front elevational view and a side elevational view of this embodiment, and, similarly to the rotary encoder shown in FIG. 15, the encoder shown is arranged so that a beam diffracted into a particular order may exit from the diffraction grating in the direction substantially perpendicular thereto.

In FIGS. 17A and 17B, like reference numerals are used for the sake of simplicity to denote like or corresponding elements which constitute each of the components shown in FIG. 12.

In this eighth embodiment, reflection mirrors 171, 172 replaces the prisms 181, 182 shown in FIG. 15, and reflection mirrors 161, 162 replaces the optical members 180, 190 each including a prism. A beam diffracted into a particular order from the diffraction grating 61 is made to exit from the grating 61 in the direction substantially perpendicular thereto by adjusting the inclinations of the reflection mirrors 161, 162. This eighth embodiment is substantially the same as the embodiment shown with FIG. 12 in respect to the other components.

Figure 18A:
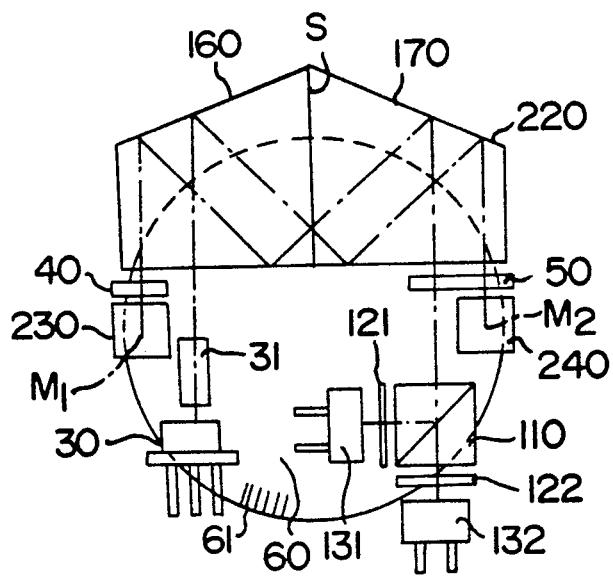
FIGS. 18A and 18B are respectively a front elevational view and a side elevational view diagrammatically showing a ninth preferred embodiment of the rotary encoder in accordance with the present invention.
Figure 18B:
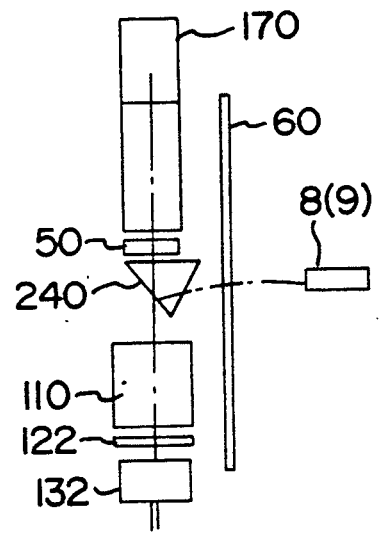

FIGS. 18A and 18B respectively illustrate the ninth embodiment of the rotary encoder in accordance with the present invention, diagrammatically showing a modification of the rotary encoder shown in perspective in FIG. 14.

FIGS. 18A and 18B are respectively a front elevational view and a side elevational view of this embodiment, and this illustrated encoder is arranged so that a beam diffracted into a particular order from the diffraction grating 61 may exit therefrom in the direction substantially perpendicular thereto.

In the ninth embodiment, the prisms 181, 182 and the polarizing beam splitter 32 shown in FIG. 15 are composed integrally with each other, thereby further simplifying the system and reducing the overall size thereof. In FIG. 18A, symbol S represents a bonding plane S along which prisms 160, 170 are bonded with each other, and the beam from the laser 30 is split into two beams via the bonding plane S. In addition, the incidence of the beam on the diffraction grating 61 is carried out by the use of small prisms 230, 240 each having a reflection plane.

Therefore, a beam diffracted into a particular order from the diffraction grating 61 is made to exit therefrom in the direction substantially perpendicular thereto by adjusting the inclinations of the small prisms 230, 240. The other features are substantially the same as that shown FIG. 14 with respect to the other components.

As described above, the particular diffracted order beam is passed forwardly and backwardly along the same optical path between the polarizing beam splitter and the reflection means, and in addition, a beam diffracted into a particular order from the diffraction grating is made to exit in the direction substantially perpendicular to the lines of the diffraction grating, whereby it is possible to reduce the overall size of the system and also to improve the accuracy of assembly.

It should be noted that, in the respective embodiments described previously, the quarter-wave plates 40, 50 may be disposed anywhere between the polarizing beam splitter 32 and the reflection means 8, 9. In the respective embodiments, a diffracted beam which is reflected may be substituted for a diffracted beam which is transmitted.

The diffraction grating used in the ninth embodiment is also an amplitude type diffraction grating including light transmitting and cutoff portions or a phase type diffraction grating including portions having refractive indexes different from each other. In particular, the phase type diffraction grating can be produced, for example, by forming a rugged relief pattern along the periphery of a transparent disc, with the result that mass production is enabled by a process such as embossing or stamping.

In accordance with this embodiment, a beam diffracted into a particular order from the diffraction grating is made to exit from the grating in the direction substantially perpendicular thereto, and is passed forwardly and backwardly along substantially the same optical path between the polarizing beam splitter and the reflection means, with the result that the state of rotation of the rotating object can be measured with high precision, and yet it is possible to achieve a rotary encoder in which the entire system is reduced in size.

Figure 19A:
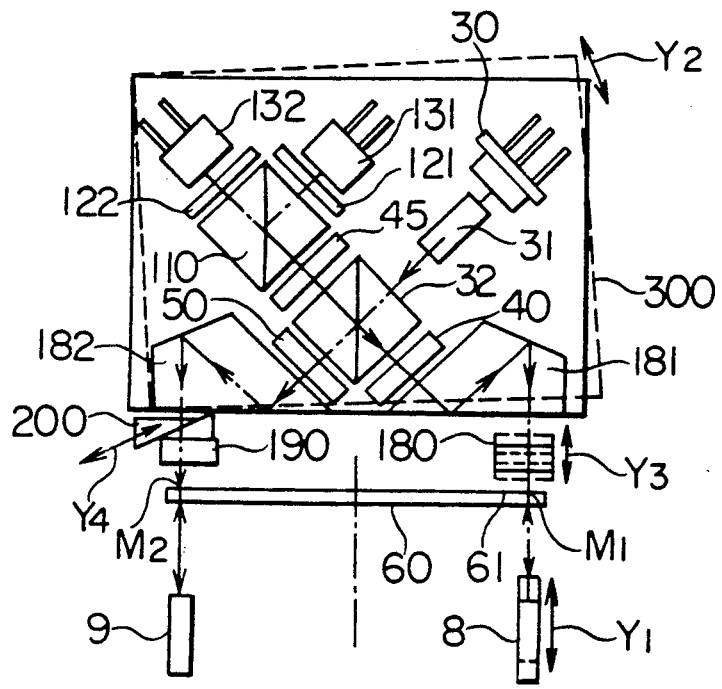
FIGS. 19A and 19B are respectively a front elevational view and a side elevational view similar to FIGS. 15A and 15B, but diagrammatically showing a system in which an optical path length correcting function is added to the rotary encoder shown in FIGS. 15A and 15B.
Figure 19B:
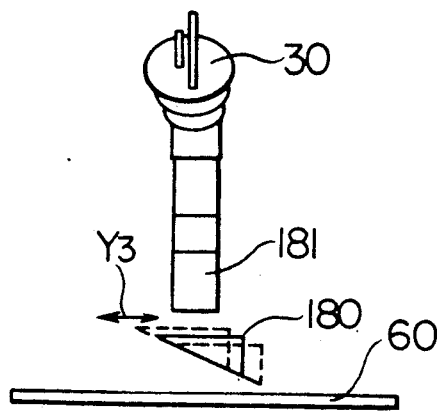
Figure 19B:
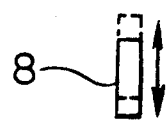

FIGS. 19A and 19B illustrate the tenth embodiment of a rotary encoder in accordance with the present invention, diagrammatically showing a system in which an optical path length correcting function is added to the rotary encoder shown in FIGS. 15A, 15B.

FIG. 19A and 19B respectively are a front elevational view and a side elevational view of this embodiment, and in these Figures, like reference numerals are used for the sake of simplicity to denote like or corresponding elements relative to those in FIGS. 15A and 15B.

Incidentally, in FIGS. 19A and 19B, reference numerals 180, 190 and 200 represent wedge-like prisms.

As described previously in the respective embodiments, a laser is well suited for use as a light source in the present invention. Particularly, in a case where the beam from the laser illuminates a rotating test piece, interference fringes being formed from the beam returned from the rotating test piece, and the state of rotation of the test piece being measured by the use of the interference fringes, it is necessary to exactly establish the stability of the oscillation wavelength of the laser and the optical path lengths of two beams which are made to interfere with each other. Since a semiconductor laser is of a small size, it is advantageous as a source of laser beams in that the overall size of the system can be reduced. However, the oscillation wavelength tends to depend on temperature changes, for example. For this reason, when the overall size of the system is to be reduced by the use of the semiconductor laser, a change occurs between the optical path lengths of two beams which are made to interfere with each other, resulting in the deterioration of measurement accuracy.

The tenth embodiment provides a rotary encoder in which when the state of rotation of a rotating object to be tested is measured by utilizing interference fringes formed by two beams emitted from a light source such as a semiconductor laser. The optical path lengths of the two beams can be easily adjusted irrespective of a certain degree of variation in the oscillation wavelength of the light source. A highly accurate measurement is achieved without a large load being applied to the rotating test piece. Thus, the overall size of the system can be easily reduced.

Referring back to FIG. 19, the beam emitted from the laser 30 is collimated into a substantially parallel beam via the collimator lens 31, and is made to enter the polarizing beam splitter 32 as a beam splitting means. The beam splitter 32 splits the beam into two linearly polarized beams: a reflected beam and a transmitted beam each having a substantially equal quantity of light. The reflected beam is circularly polarized via the quarter-wave plate 40, and, after the circularly polarized beam has been passed through the prisms 181 and 182, it is made incident on the position $M_1$ of the diffraction grating 61 which is radially formed on the disc 60 coupled with the rotating object to be measured. At this time, the beam is made incident in such a manner that beam diffracted into a particular order from the diffraction grating 61 may exit from the grating 61 in the direction substantially perpendicular thereto. A beam diffracted into a particular order of a transmitted beam diffracted from the diffraction grating 61 is reflected from the reflection means 8, and is returned along the same optical path. The beam is again made incident on substantially the same position $M_1$ on the diffraction grating 61. The particular order beam re-diffracted from the diffraction grating 61 is made incident on the polarizing beam splitter 32 in linearly-polarized form via the quarter-wave plate 40 with the axis of polarization being shifted through 90° with respect to that at the time of the preceding incidence.

In this tenth embodiment as well, the particular diffracted order beam is passed forwardly and backwardly along the same optical path between the polarizing beam splitter 32 and the reflection means 8.

Referring back to FIG. 19, the transmitted beam of the two split beams which are generated by the polarizing beam splitter 32 is circularly polarized via the quarter-wave plate 50. After the circularly polarized beam has been passed through the prisms 181, 182, it is made incident on the position $M_2$ which is in substantial point symmetry relative to the position $M_1$ on the diffraction grating 61 on the disc 60 about the axis of the rotary shaft 70. A particular-order beam of the transmitted beam diffracted from the diffraction grating 61 is returned along the same optical path by the reflection means 9 similar to the previously described reflection means 8, the returned beam being again made incident on substantially the same position $M_2$ of the diffraction grating 61. The particular diffracted order beam which is again diffracted from the diffraction grating 61 is made incident on the polarizing beam splitter 32 in linearly polarized form via the quarter-wave plate 50 with the axis of polarization being shifted through 90° with respect to that at the time of the preceding incidence.

At this time, as in the case of the previously described reflected beam, the particular diffracted order beam derived from the transmitted beam is also passed forwardly and backwardly along the same optical path between the polarizing beam splitter 32 and the reflection means 9. After this diffracted beam has been superposed on the diffracted beam entering from the reflection means 8, the superposed beam is circularly polarized by the quarter-wave plate 45, then split into two beams by the beam splitter 110. These respective beams are passed through the polarizing plate 121, 122 which are disposed with their axis of polarization being inclined at 45° with respect to each other, and are linearly polarized with a 90° phase difference therebetween. The respective linearly polarized beams are made incident on the corresponding beam receiving means 131, 132, and detection is made with respect to the intensity of the interference fringes of the two beams produced by the beam receiving means 131, 132.

In the tenth embodiment, the polarizing beam splitter 32 is disposed on the apex of a substantially perpendicular bisector connecting the incidence points $M_1$, $M_2$ on the diffraction grating 61, or in the direction normal to the substantially perpendicular bisector, and this equalizes the optical path lengths of the two beams.

In this tenth embodiment as well, as the rotating object to be measured is rotated by one pitch of the diffraction grating 61, the phase of the beam diffracted into order "m" varies by 2 m$\pi$. Similarly, the beam which is re-diffracted into order "n" from the diffraction grating 61 is varied by 2 n$\pi$. As a result, the beam receiving means provide sinusoidal waveforms of (2 m−2 n) in total. In this embodiment, the amount of rotation is measured by detecting these sinusoidal waveforms.

As an example, if the diffraction grating pitch is 3.2 $\mu$m and diffracted into orders "1" and "−1" are utilized, when the rotating object is rotated by a pitch of 3.2 $\mu$m, the beam receiving elements provide four sinusoidal waveforms in total. Specifically, the resolution per sinusoidal waveform is 3.2/4=0.8 $\mu$m equivalent to a quarter of one pitch of the diffraction grating.

However, if an oscillation wavelength $\lambda$ of the laser as a light source is varied under the influence of factors such as temperature conditions, a phase shift $\Delta\phi$ between the two beams is:

$$\Delta\phi = 2\pi \left( \frac{d}{\lambda + \Delta\lambda} - \frac{d}{\lambda} \right)$$
$$\approx -2d \frac{\Delta\lambda}{\lambda^2}$$

where d is the difference between the optical path lengths of the two beams.

If a synchronizing signal output from the light receiving means is divided by X, for example, by electronic division, and is converted into numerical data, the phast shift $\Delta\phi$ between the two beams derived from variations in the oscillation wavelength of the laser does not substantially influence the characteristics by satisfying the following inequality:

$$\left| d \frac{\Delta\lambda}{\lambda^2} \right| < \frac{1}{2X}$$

For example, if $\lambda$=780 nm, $\Delta\lambda$=0.3 nm (based on "mode hop") and x=4, we can show that:

$$|d| < \frac{\lambda^2}{2 \times |\Delta\lambda|} \approx 250 \text{ nm}$$

In this embodiment, adjustment means is provided in order to satisfy the above conditions, and adjustment is made so as to substantially equalize the optical path lengths of the two beams.

The adjustment means and its adjusting method are as follows.

a) The reflection means either 8 or 9 is moved in the direction of the optical axis as indicated by double headed arrow Y1 shown in FIG. 19A.

b) All the elements surrounded by a dotted line 300 in FIG. 19A are inclined as one unit as indicated by double headed arrow Y2 shown in FIG. 19A.

c) The wedge-like prism 180 is moved in the vicinity of the diffraction grating 61 in the direction of double headed arrow Y3 shown in FIG. 19A, so as to physically adjust the thickness of the prism 180.

d) The wedge-like prisms 190 and 200 are superposed on each other in the vicinity of the diffraction grating 61 to form a flat plate having opposite surfaces parallel to each other, with at least one of the prisms being slid in the direction of double headed arrow Y4.

e) Two reflection mirrors or prisms including two reflection planes are used to alter either of the optical path lengths.

In addition to the above noted examples, whatever adjustment means may alter either of the optical path lengths of the two beams can be employed, and also such adjustment means may be placed anywhere in the system.

In the tenth embodiment, the beam is split into two beams via the beam splitter 110, and a 90° phase difference is established therebetween, whereby it is also possible to discriminate the direction of rotation of the rotating object.

It is to be noted that, if the sole amount of rotation is measured, it is unnecessary to use the beam splitter 110, the polarizing plates 121, 122 nor either of the light receiving means 131 and 132.

In this tenth embodiment, measurement errors based on the eccentricity between the rotation center of the rotating object and the center of the diffraction grating can be reduced by using the beam diffracted from the positions $M_1$, $M_1$ located in point symmetry relative to the rotation center.

It is to be noted that, although the arrangement according to the second embodiment utilizes the beams diffracted from the points $M_1$, $M_2$ in substantial point symmetrical relationship with each other, it is possible to achieve the substantial same effect by using beams diffracted from a plurality of positions, in addition to the point-symmetrical points. As an example, it is effective to utilize beams diffracted from three positions spaced apart by 120° with respect to one another.

In addition, two beams are superposed on each other in such a manner that the beam element of the one beam nearer the center of the rotating shaft is superposed on the beam element of the other beam nearer the axis of the rotating shaft. Similarly, the beam elements of these beams away from the rotation axis are superposed on each other, thereby eliminating the influence of the wavefront aberration derived from the difference between the pitches on the inner and outer sides.

Moreover, in the tenth embodiment, the particular diffracted order beams are respectively passed forwardly and backwardly along the same optical paths between the polarizing beam splitter 32 and the corresponding reflection means 8 and 9, so that the two beams can be easily superposed on each other in the polarizing beam splitter 32, and this improves the accuracy of assembly of the entire system.

In the tenth embodiment as well, a diffracted beam which is reflected may be substituted for a diffracted beam which is transmitted.

The diffraction grating used in the tenth embodiment is also an amplitude type diffraction grating including beam transmitting and cutoff portions or a phase type diffraction grating including portions having refractive indexes different from each other. In particular, the phase type diffraction grating can be produced, for example, by forming a rugged relief pattern along the circumference of a transparent disc, with the result that mass production is enabled by a process such as embossing or stamping.

In accordance with the last-mentioned embodiment, the optical path length of either of two beams is adjusted by using adjustment means, thereby substantially equalizing the optical path lengths of the two beams, so that it is possible to prevent the deterioration of measurement accuracy involved by the use of a light source such as a semiconductor laser whose oscillation wavelength tends to fluctuate, with the result that the state of rotation of the rotating object can be measured with high precision, and yet it is possible to achieve a rotary encoder in which the entire system is reduced in size.

What we claim is:

1. An encoder arranged to detect the state of movement between a diffraction grating and a light incident on the diffraction grating, comprising:

light source means for supplying light;

splitting means for splitting the light into a plurality of beams of light;

directing means for directing the plurality of light beams onto a movable diffraction grating to be diffracted;

reflecting means for reflecting a particular order of diffracted light beams with exit from the diffraction grating and have a phase which varies with the rotation thereof, said reflecting means including a lens, having an optical axis, arranged in the light paths of said diffracted light beams and a reflecting surface disposed at a position on which said diffracted light beams are focused by said lens, and said reflecting means directing said diffracted light beams back to the position on the diffraction grating where said diffracted light beams exit so as to be re-diffracted, wherein said diffracted light beams travel along substantially the same light path as the incident light received by said reflecting means through cooperation between said lens and said reflecting surface, said reflecting means being arranged so that the light path of the particular order of diffracted light beams is substantially parallel with the optical axis of said lens; and photoelectric conversion means for photoelectrically converting interference fringes formed by said re-diffracted light beams exiting from the diffraction grating and mutually interfering so as to detect the state of movement of the diffraction grating.

2. An encoder as claimed in claim 1, wherein said lens is a gradient index lens having flat surfaces opposite to each other.

3. An encoder according to claim 2, wherein said gradient index lens has said reflecting surface formed in one of said flat surfaces thereof.

4. An encoder according to claim 3, wherein said reflecting surface is formed only near a center portion of said flat surface.

5. An encoder as claimed in claim 1 further includes a beam limiting mask disposed at the front of said reflecting surface.

6. An encoder according to claim 1, wherein said directing means directs a plurality of light beams onto the diffraction grating.

7. An encoder as claimed in claim 1, wherein said reflecting means is movable along an optical path of said particular order of diffracted light beams entering said reflecting means, and the difference between the optical path lengths of said light beams forming said interference fringes is adjusted by movement of said reflecting means.

8. An encoder arranged to detect the state of movement between a diffraction grating and a light incident on the diffraction grating, comprising:
light source means for supplying light;
splitting means for splitting the light into a plurality of beams of light;
directing means for directing the plurality of light beams onto a movable diffraction grating to be diffracted;
reflecting means for reflecting a particular order of said diffracted light beams with exit from the diffraction grating and vary with the rotation thereof, said reflecting means including a lens, having an optical axis, arranged in the light path of said diffracted light beams and a reflecting surface reflecting said diffracted light beams converged by said lens, and said reflecting means directing said diffracted light beams to the positions on the diffraction grating where said diffracted light beams exit so as to be re-diffracted, wherein said diffracted light beams travel along substantially the same light path as the incident light received by said reflecting means through cooperation between said lens and said reflecting surface, said reflecting means being arranged so that the light path of said particular order of said diffracted light beams is substantially parallel with the optical axis of said lens; and
photoelectric conversion means for photoelectrically converting interference fringes formed by said re-diffracted light beams exiting from the diffraction grating to be mutually interfered so as to detect the state of movement of the diffraction grating.

9. An encoder arranged to detect the state of movement of a grating, comprising:
light source means for supplying light;
splitting means for splitting the light into a plurality of beams of light;
directing means for directing the plurality of light beams onto different positions on a movable diffraction grating to be diffracted;
first and second reflecting means for reflecting a particular order of diffracted light beams which exit from the diffraction grating and have a phase which varies with the rotation thereof, said first and second reflecting means each including a lens having an optical axis, and being arranged in the light path of said diffracted light beams and a respective reflecting surface disposed at positions where said diffracted light beams are focused by said respective lens, and said first and second reflecting means directing said diffracted light beams to positions on the diffraction grating where said diffracted light beams exit so as to be re-diffracted, wherein said diffracted light beams travel along substantially the same light path as the incident light received by said first and second reflecting means through cooperation between said respective lens and said respective reflecting surface, said first and second reflecting means being arranged at different positions from each other so that the respective light path of the particular order of said diffracted light beams is substantially parallel with the optical axis of the respective lens; and
photoelectric conversion means for photoelectrically converting interference fringes formed by said re-diffracted light beams exiting from each of the different positions to mutually interfere so as to detect the state of movement of the diffraction grating.

10. An encoder as claimed in claim 9, wherein said first and second reflecting means are movable along an optical path of said particular order of diffracted light beams entering said first and second reflecting means, and the difference between optical path lengths of said light beams forming said interference fringes is adjusted by movement of said first and second reflecting means.

11. An encoder according to claim 9, wherein each said lens is a gradient index lens having flat surfaces opposite to each other, and each said reflecting surface is formed on one of said flat surfaces of each respective lens.

12. A rotary encoder arranged to detect the state of rotation of an object, comprising:
light source means for supplying light;
splitting means for splitting the light into a plurality of beams of light;
optical means for directing the plurality of light beams onto a diffraction grating formed along the direction of rotation of a rotating object to be diffracted;
reflecting means for reflecting a particular order of said diffracted light beams which exit from the diffraction grating and have a phase which varies with the rotation thereof, said reflecting means including a lens, having an optical axis, arranged in the light path of said diffracted light beams and a reflecting surface disposed at a position on which said diffracted light beams are focused by said lens, and said reflecting means directing said diffracted light beams back to the position on the diffraction grating where said diffracted light beams exit so as to be re-diffracted, wherein said diffracted light beams travel along substantially the same light path as the incident light received by said reflecting means through cooperation between said lens and said reflecting surface, said reflecting means being arranged so that the light path of the particular order of said diffracted light beams is substantially parallel with the optical axis of said lens; and
photoelectric conversion means for photoelectrically converting interference fringes formed by said re-diffracted light beams exiting from the diffraction grating and mutually interfering so as to detect the state of rotation of the rotating object.

13. A rotary encoder as claimed in claim 12 further includes a beam limiting mask disposed in front of said reflecting surface.

14. A rotary encoder as claimed in claim 12, wherein:
said plurality of light beams are made incident on different positions of the diffraction grating.

15. An encoder as claimed in claim 12, wherein said reflecting means is movable along an optical path of said particular order of diffracted light beams entering said reflecting means, and the difference between the optical path lengths of said light beams forming said interference fringes is adjusted by movement of said reflecting means.

16. A rotary encoder according to claim 12, wherein said lens is a gradient index lens having flat surfaces opposite to each other and said reflecting surface is formed on one of said flat surfaces of said lens.

17. A rotary encoder for detecting the state of rotation of an object comprising:

light source means for supplying a light beam;

splitting means for splitting the light beam into a plurality of beams of light which are directed onto different positions on a diffraction grating formed along the direction of rotation of a rotating object to be diffracted;

first and second reflecting means for reflecting a particular order of diffracted light beams which exit from the diffraction grating and vary with the rotation thereof, said first and second reflecting means each including a lens having an optical axis, and being arranged in the light path of said diffracted light beams and a respective reflecting surface disposed at a position where said diffracted light beams are focused by said respective lens, and said first and second reflecting means directing said diffracted light beams to positions on the diffraction grating where said diffracted light beams exit so as to be re-diffracted, wherein said diffracted light beams travel along substantially the same light path as the incident light received by said first and second reflecting means through cooperation between said respective lens and said respective reflective surface, said first and second reflecting means being arranged at different positions from each other so that the respective light path of the particular order of said diffracted light beams is substantially parallel with the optical axis of the respective lens; and photoelectric conversion means for photoelectrically converting interference fringes formed by said rediffracted light beams exiting from the different positions to be mutually interfered so as to detect the state of rotation of the rotating object.

18. An encoder as claimed in claim 17, wherein said first and second reflecting means are movable along an optical path of said particular order of diffracted light beams entering said first and second reflecting means, and the difference between optical path lengths of said light beams forming said interference fringes is adjusted by movement of said first and second reflecting means.

19. A rotary encoder according to claim 17, wherein each said lens is a gradient index lens having flat surfaces opposite to each other, and each said reflecting surface is formed on one of said flat surfaces of each respective lens.

20. A rotary encoder as claimed in claim 17, wherein said light source means includes a semiconductor laser.

21. A rotary encoder as claimed in claim 17, wherein said splitting means is a polarizing beam splitter.

22. A rotary encoder as claimed in claim 21, wherein at least one quarter-wave plate is present in the optical paths of the split beams generated by said polarizing beam splitter.

23. A rotary encoder according to claim 17, wherein one of said first and second reflecting means is adapted to be movable along said optical axis.

24. An encoder arranged to detect the state of movement between a diffraction grating and a light incident on the diffraction grating, comprising:

light source means for supplying light;

splitting means for splitting the light into a plurality of beams of light;

directing means for directing the plurality of light beams onto a movable diffraction grating to be diffracted;

reflecting means for reflecting a particular order of said diffracted light beams which exit from the diffraction grating and have a phase which varies with the movement thereof, said reflecting means including a lens, having an optical axis, arranged in the light paths of said diffracted light beams and a reflecting surface disposed at a position on which said diffracted light beams are focused by said lens, and said reflecting means directing said diffracted light beams back to the position on the diffraction grating where said diffracted light beams exit so as to be re-diffracted, wherein said diffracted light beams travel along substantially the same light path as the incident light received by said reflecting means through cooperation between said lens and said reflecting surface, said reflecting means being arranged so that the light path of the particular order of diffracted light beams is substantially parallel with the optical axis of said lens; and photoelectric conversion means for photoelectrically converting interference fringes formed by said re-diffracted light beams exiting from the diffraction grating and mutually interfering so as to detect the state of movement of the diffraction grating.

* * * * *

UNITED STATES PATENT AND TRADEMARK OFFICE
CERTIFICATE OF CORRECTION

PATENT NO. : 5,036,192

DATED : July 30, 1991

INVENTOR(S) : Koh Ishizuka, et al.

It is certified that error appears in the above-identified patent and that said Letters Patent is hereby corrected as shown below:

COLUMN 2:

Line 47, "grating 31" should read --grating 3--.

COLUMN 5:

Line 9, "quarter-wave" should read --half-wave--.

Line 14, "plate $4_5$," should read --plate $4_2$,--.

COLUMN 9:

Line 9, "concave" should read --convex--.

Line 11, "concave" should read --convex--.

Line 25, "lineally" should read --linearly--.

COLUMN 14:

Line 1, "$M_1$, $M_1$" should read --$M_1$, $M_2$--.

COLUMN 16:

Line 34, "member 18" should read --member 180--.

Line 36, "the" (first occurrence) should read --on the--.

UNITED STATES PATENT AND TRADEMARK OFFICE
CERTIFICATE OF CORRECTION

PATENT NO. : 5,036,192

DATED : July 30, 1991

INVENTOR(S) : Koh Ishizuka, et al.

It is certified that error appears in the above-identified patent and that said Letters Patent is hereby corrected as shown below:

Line 64, "lineally" should read --linearly--.

COLUMN 18:

Line 9, "splitter 11," should read --splitter 110,--.

Line 28, "$M_1$, $M_1$" should read --$M_1$, $M_2$--.

COLUMN 22:

Line 22, "and" (1st occurrence) should read -- and the beam --.

COLUMN 23:

Line 34 "$M_1$, $M_1$" should read --$M_1$, $M_2$--.

Line 37, "second" should read --seventh--.

COLUMN 24:

Line 29, "with" should read --which--.

UNITED STATES PATENT AND TRADEMARK OFFICE
CERTIFICATE OF CORRECTION

PATENT NO. : 5,036,192

DATED : July 30, 1991

INVENTOR(S) : Koh Ishizuka, et al.

It is certified that error appears in the above-identified patent and that said Letters Patent is hereby corrected as shown below:

COLUMN 26:

Line 57, "wherein:" should read --wherein--.

Signed and Sealed this

Twentieth Day of April, 1993

Attest:

MICHAEL K. KIRK

Attesting Officer

Acting Commissioner of Patents and Trademarks